(12) United States Patent
Michisaka et al.

(10) Patent No.: US 7,147,281 B2
(45) Date of Patent: Dec. 12, 2006

(54) MOTORCYCLE SEAT STRUCTURE

(75) Inventors: Susumu Michisaka, Saitama (JP);
Masao Ogawa, Saitama (JP);
Tomokatsu Suda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 104 days.

(21) Appl. No.: 10/827,293

(22) Filed: Apr. 20, 2004

(65) Prior Publication Data
US 2004/0222679 A1 Nov. 11, 2004

(30) Foreign Application Priority Data
May 9, 2003 (JP) .............................. 2003-132410
May 9, 2003 (JP) .............................. 2003-168474

(51) Int. Cl.
*B62J 1/00* (2006.01)

(52) U.S. Cl. ........................... 297/215.12; 297/195.12; 297/188.04; 297/188.09; 297/188.1; 297/243

(58) Field of Classification Search ........... 297/195.12, 297/215.11, 215.12, 188.04, 188.06, 188.09, 297/188.1, 188.01, 243, 354.3
See application file for complete search history.

(56) References Cited

U.S. PATENT DOCUMENTS 3,549,172 A * 12/1970 McBroom et al. .. 297/215.12 X
4,462,634 A * 7/1984 Hanagan ...................... 297/243
4,953,911 A * 9/1990 Hanagan ................. 297/215.12
6,068,334 A * 5/2000 Bonfilio ................. 297/215.12
6,631,948 B1 * 10/2003 Tsuge ..................... 297/195.12

FOREIGN PATENT DOCUMENTS

JP 2002-145143 A 5/2002

* cited by examiner

*Primary Examiner*—Anthony D. Barfield
(74) *Attorney, Agent, or Firm*—Birch, Stewart, Kolasch & Birch, LLP

(57) ABSTRACT

A motorcycle having a loading space for stably loading luggage. Luggage may be loaded onto a rear loading space with the luggage being fixed by fastening a rope to a grab rail. A seat back is provided that also functions as a passenger seat. When only one person rides, luggage can be loaded onto the rear space and can be fastened by hanging the luggage on a hook directly or indirectly using the rope. As the hook disappears when a seat back that also functions as a passenger seat is positioned to be substantially horizontal, the appearance quality is not damaged. Therefore, luggage can be stably loaded and a larger quantity of luggage can be carried by the motorcycle. Left and right slider are provided for permitting free longitudinal movement of the seat from a substantially horizontal position to a raised position.

16 Claims, 25 Drawing Sheets

FIG. 11(a)         FIG. 11(b)

Comparative Example

Embodiment

MOTORCYCLE SEAT STRUCTURE

CROSS-REFERENCE TO RELATED APPLICATIONS

The present application claims priority under 35 USC 119 to Japanese Patent Application Nos. 2003-132410 and 2003-168474 both filed on May 9, 2003 the entire contents thereof are hereby incorporated by reference.

BACKGROUND OF THE INVENTION

1. Field of the Invention

The present invention relates to the seat structure of a motorcycle.

2. Description of Background Art

Heretofore, inventions related to a tandem seat used in a motorcycle have been proposed, for example, as set forth in FIGS. 7(D) to 7(F) of Japanese patent document JP-A-2002-145143.

FIGS. 24(a) to 24(c) in the present drawings is equivalent to FIGS. 7(D) to 7(F) in Japanese patent document JP-A-2002-145143. FIG. 24(c) shows an embodiment wherein two persons can ride the vehicle and FIG. 24(b) shows seat arrangement wherein only one person can ride the vehicle.

Heretofore, it is known that a passenger seat 3R may be raised and fills the role of a backrest of a rider. As is illustrated in FIG. 24(b), the idea of utilizing the space to the rear of the passenger seat 3R as a loading space when only one person rides the vehicle is not shown. Even if luggage is loaded onto the rear space, there is no hook for fastening a rope.

In a motorcycle having a small area for loading luggage, it is desired to secure a loading space on which luggage can be more stably loaded.

An object of the present invention is to provide a seat structure in which a loading space can be secured when only one person is positioned on a motorcycle designed for use by two persons.

Heretofore, a motorcycle provided with a slidable tandem seat is known, for example, as set forth in FIG. 2 of Japanese patent document JP-A-2002-145143.

FIG. 25 in the present drawings is equivalent to FIG. 2 of Japanese patent document JP-A-2002-145143. A rider's seat 3F is provided adjacent to passenger seat 3R. A rail member 21 is provided for supporting the rider's seat with a sliding member 22 for the rider's seat. A rail member 26 is provided for the passenger's seat with a sliding member 27 for the passenger's seat. The longitudinal position of the seats can be shifted by longitudinally sliding the passenger seat 3R together with the rider's seat 3F. According to FIG. 1 in Japanese patent document JP-A-2002-145143, the passenger seat 3R is coupled to the rider's seat 3F via a hinge (not shown).

As the rail member 26 is arranged under the passenger seat 3R, the structure of the rear of the body is intricate. Even if the passenger seat 3R is raised when only one person is seated on the motorcycle, it is difficult to load luggage onto the rear space because the rail member 26 exists in space at the back of the rider's seat 3F.

SUMMARY AND OBJECTS OF THE INVENTION

It is desired in a motorcycle that is provided with a seat sliding mechanism that luggage can be stably loaded onto rear space.

To achieve this object of the present invention, a motorcycle is provided with a rider's seat for positioning a rider and a passenger seat for positioning a passenger wherein the passenger seat is a seat back that also functions as the passenger seat which is raised when only one rider rides the motorcycle and which can be used as a backrest of for the rider. The passenger seat or seat back is provided with a hook that enables the fastening of a rope and other fasteners on the back when the passenger seat is raised.

As the hook for enabling the fastening of a rope or other means is provided to the back of the passenger seat when the passenger seat is raised. Thus, luggage can be loaded onto the rear space when only one person rides the motorcycle and can be fastened by hanging the luggage on the hook directly or indirectly using a rope or others means. As the hook disappears when the seat back is positioned to be horizontal to function as a passenger seat, the appearance quality of the vehicle is not damaged.

Therefore, luggage can be stably loaded and a larger quantity of luggage can be carried by the motorcycle according to the present invention.

Thus, a loading space for a motorcycle is provided when a seat back is raised to function as a passenger seat.

Luggage can be stably loaded when only one person rides the motorcycle by providing the loading space at the back of a rider's seat.

In addition, a motorcycle is provided with a reverse U-shaped grab rail when the grab rail is viewed from the side of the loading space.

The grab rail that functions as a grip member for a passenger when two persons are riding and can be used for passing a string or a rope through the grab rail reverse U-shape. Thus, luggage can be easily fixed by the string or the rope. It is noted that the grab rail is attached to a body frame under the loading space.

An attaching part for the grab rail disappears by hiding the grab rail attaching part under the loading space. Thus, the quality of the appearance around the grab rail can be enhanced.

A glove compartment extends longitudinally in the body and is attached to a rear frame supporting a loading space. In addition, a flange protrudes forward from the glove compartment.

The glove compartment can house small things that are too small to load on the loading space. Thus, the loading capacity can be enhanced by the glove compartment and the loading space.

In addition, equipment such as a secondary air control valve can be covered by the flange protruding forward from the glove compartment and a body cover can be made more compact.

To achieve the this object, a seat sliding mechanism is provided to a body frame with a rider's seat attached to the seat sliding mechanism and a passenger seat attached to the rider's seat or the seat sliding mechanism so that the passenger seat can be raised or pushed down. An inside frame is provided in the vicinity of a rear frame provided to the rear of a body frame. When the passenger seat is in a horizontal state, the passenger seat is supported by the inside frame.

When the seat sliding mechanism is not required to be provided under the passenger seat, in this case it is conceivable to provide a structure wherein the passenger seat is attached to a rider's seat via a strong link so that the passenger seat can be raised or pushed down and the whole load of the passenger seat is supported by the rider's seat. However, the link is large in size. In this case, the link fills only the role of linkage and a load of the passenger seat is supported by the inside frame provided in the vicinity of the rear frame.

As a result, the link for the linkage can be of a small-size and is light in weight. As no rail member for sliding the seat is required to be provided under the passenger seat, luggage can be loaded onto the space at the back of the rider's seat.

The passenger seat can be supported in any position by extending the inside frame longitudinally in the body.

Therefore, according to the present invention, even in a motorcycle provided with the seat sliding mechanism, luggage can be stably loaded onto the rear space.

In addition, a passenger seat is arranged so that it is housed inside a rear frame when the passenger seat is viewed from the top in a horizontal state.

The passenger seat is not required to be of a larger size than needed and can be made compact. Further, the rear frame can be utilized as an appearance part. Hereby, vehicles completely different in appearance can be produced using a body frame of a fully covered motorcycle.

With regard to the loading space that is attached to a rear frame in a configuration wherein the loading space is loaded on an inside frame with a raised passenger seat that functions as a backrest for a rider, luggage can be loaded onto the loading space.

Various arrangements of the seats are enabled and the load capacity of the loading space can be enhanced by the action of both the rear frame and the inside frame.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 11(a) to 11(c) show the contrast between the new and conventional type combination locking devices;

DETAILED DESCRIPTION OF THE PREFERRED EMBODIMENTS

Referring to the attached drawings, an embodiment of the invention will be described below. The drawings shall be viewed in a direction of the reference numbers.

In this embodiment, a low deck-type vehicle will be described using a scooter-type vehicle as an example. However, the low deck-type vehicle may also be any of a motorcycle, a three-wheeled vehicle and a four-wheel vehicle. A low deck-type vehicle is a vehicle which is provided with a front wheel and a rear wheel in a longitudinal direction of a body frame, in which a main frame extends rearwardly from a head pipe of the body frame and is of a V-type or U-shaped when it is viewed from the side and which is configured so that a rider can straddle the main frame easily. However, the type of vehicle is not specific and the present invention may be used in connection with a variety of vehicles.

Figure 1:
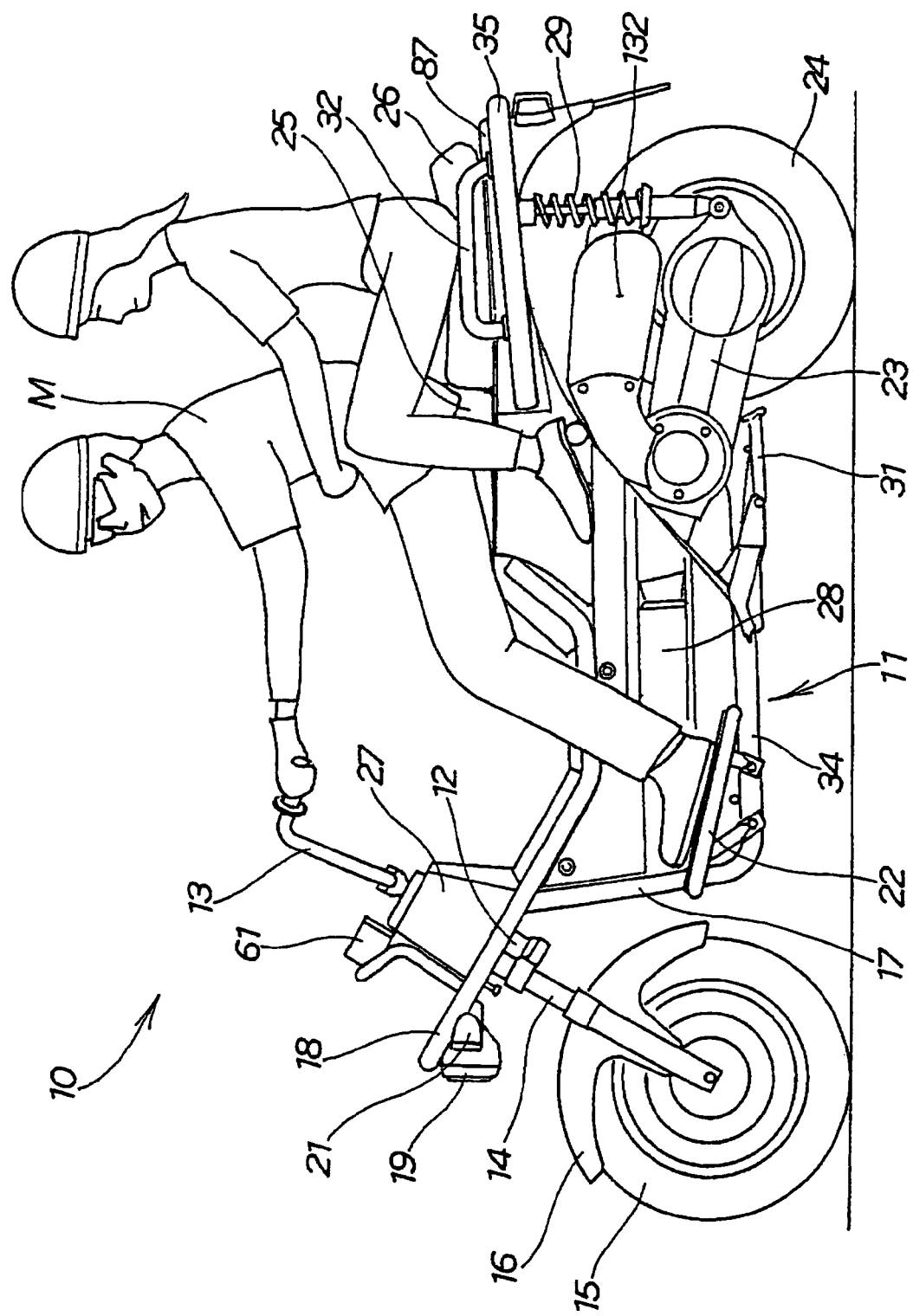
FIG. 1 is a side view showing a scooter-type vehicle according to the invention.

FIG. 1 is a side view showing the scooter-type vehicle according to the present invention for the basic structure of the scooter-type vehicle 10. A steering handlebar 13 is attached to a head pipe 12 in the front of a body frame 11 so that the steering handlebar can be freely steered. A front wheel 15 and a front fender 16 are attached to a front fork 14 that is coupled to the steering handlebar 13.

The scooter-type vehicle 10 is a light vehicle which can be ridden double and in which another frame 18 is attached to the body frame 11. A headlamp 19 and a turn signal lamp 21 are attached to another frame 18 with a step 22, being provided to a down tube 17. A power unit 23 is attached to the rear of the body frame 11 so that the power unit can be vertically swung with a rear wheel 24 being attached to the rear of the power unit 23. A rider's seat 25 is provided on the diagonal upside of the rear wheel 24 toward the front and a seat back 26, that also functions as a passenger seat, is provided on the upside of the rear wheel 24.

As shown in FIG. 1, a handlebar post cover 27 is provided together with a side cover 28, 29, a rear cushion 29, a stand 31 and a grab rail 32.

Figure 2:
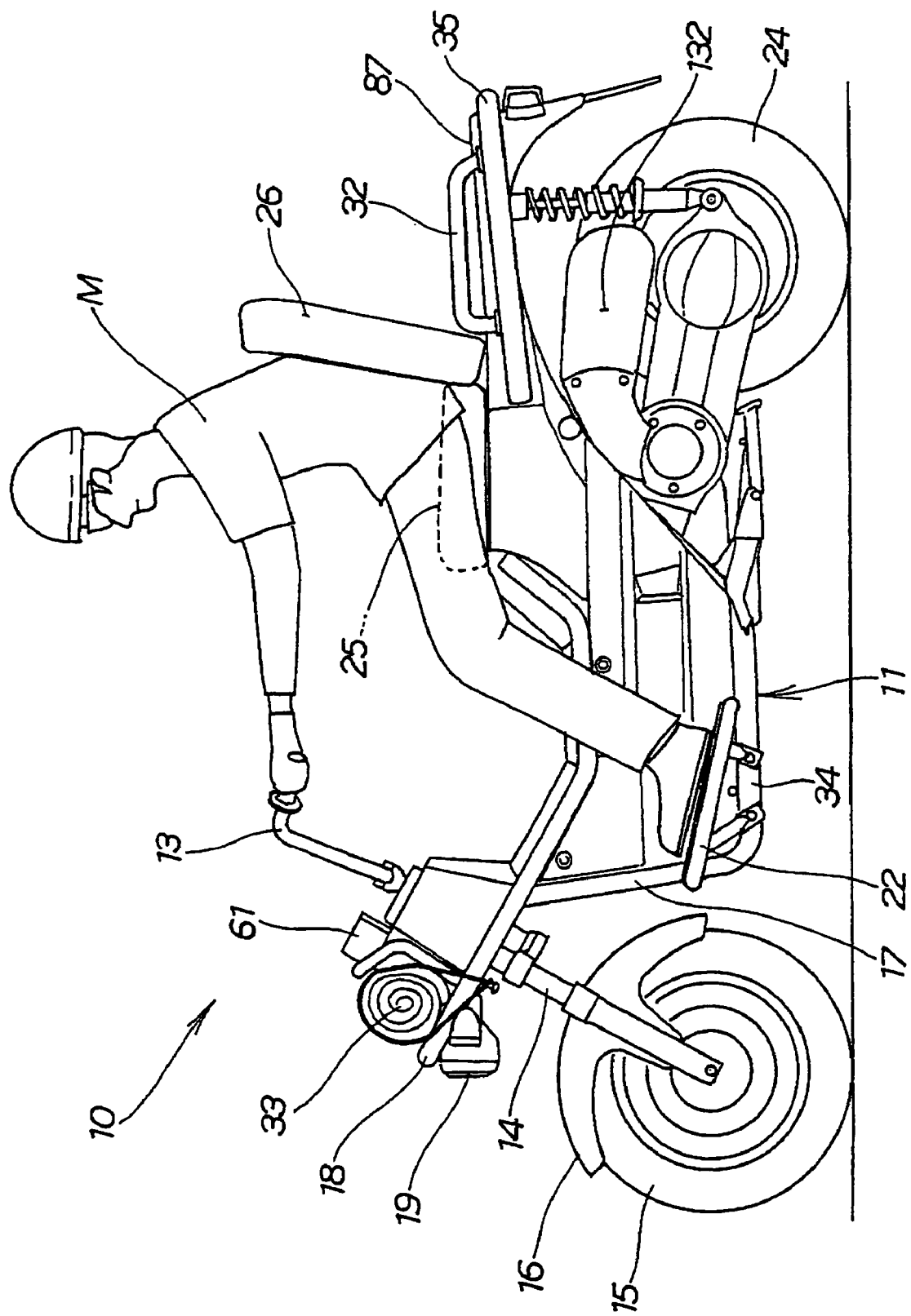
FIG. 2 is a side view showing the scooter-type vehicle according to the invention which is changed for use by a single rider.

FIG. 2 is a side view showing the scooter-type vehicle according to the invention which is specified for a single rider. The basic configuration is the same as that shown in FIG. 1 with the same reference numbers being used and thus the description of the reference numbers is omitted. FIG. 2 shows that the seat back 26 that also functions as the passenger seat that is raised and is used as a backrest for a rider M. In addition, FIG. 2 shows that luggage 33 such as a tent may be loaded onto the front of another frame 18.

Further, as illustrated in FIG. 2 the steering handlebar 13 and the grab rail 32 are provided together with another frame 18, the down tube 17, a lower pipe 34 extending from the down tube 17 and a rear frame 35 that is exposed.

It is ordinary that in a conventional type scooter-type vehicle, a body frame is covered with a body cover and most of the body frame is not exposed. In the meantime, in the present invention, most of the body frame is exposed so that an unprecedented visual characteristic is produced.

Figure 3:
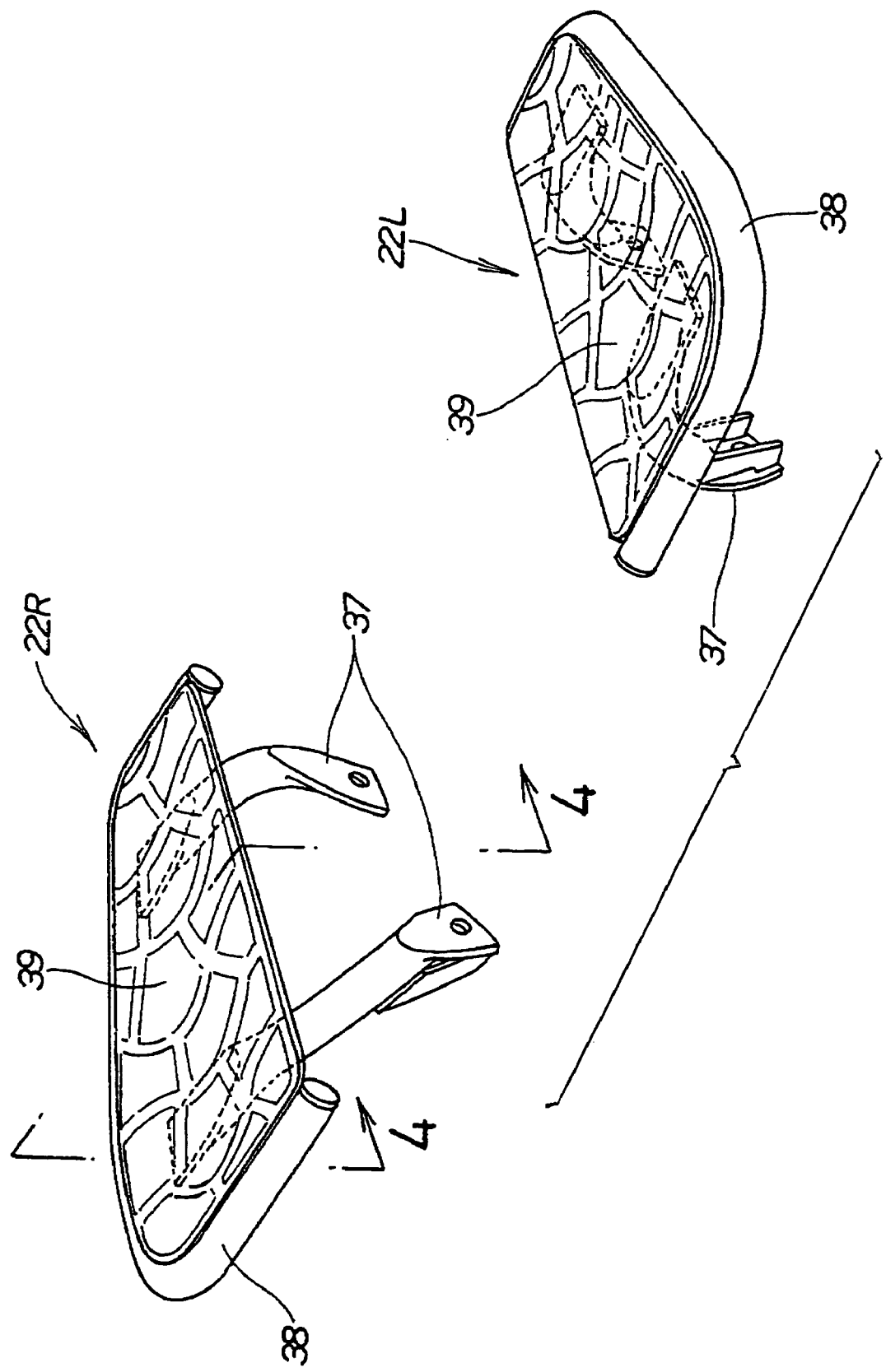
FIG. 3 is a perspective view showing a step adopted in the invention.

FIG. 3 is a perspective view showing steps adopted in the present invention, with a right step 22R (R is a subscript showing the right side) on which the rider places his/her right foot. The right step 22R is composed of a support plate 36, stays 37 for coupling the support plate 36 to the down tube, a pipe 38 surrounding the periphery of the support plate 36 and a rubber plate 39 attached to the top face of the support plate 36. A soft resin plate may be also used in place of the rubber plate 39.

The left step 22L (L is a subscript showing the left side) is provided for placing a rider's left foot. The left step 22L has the same structure as the right step 22R. Thus, the same reference numbers are used and the description is omitted.

Figure 4:
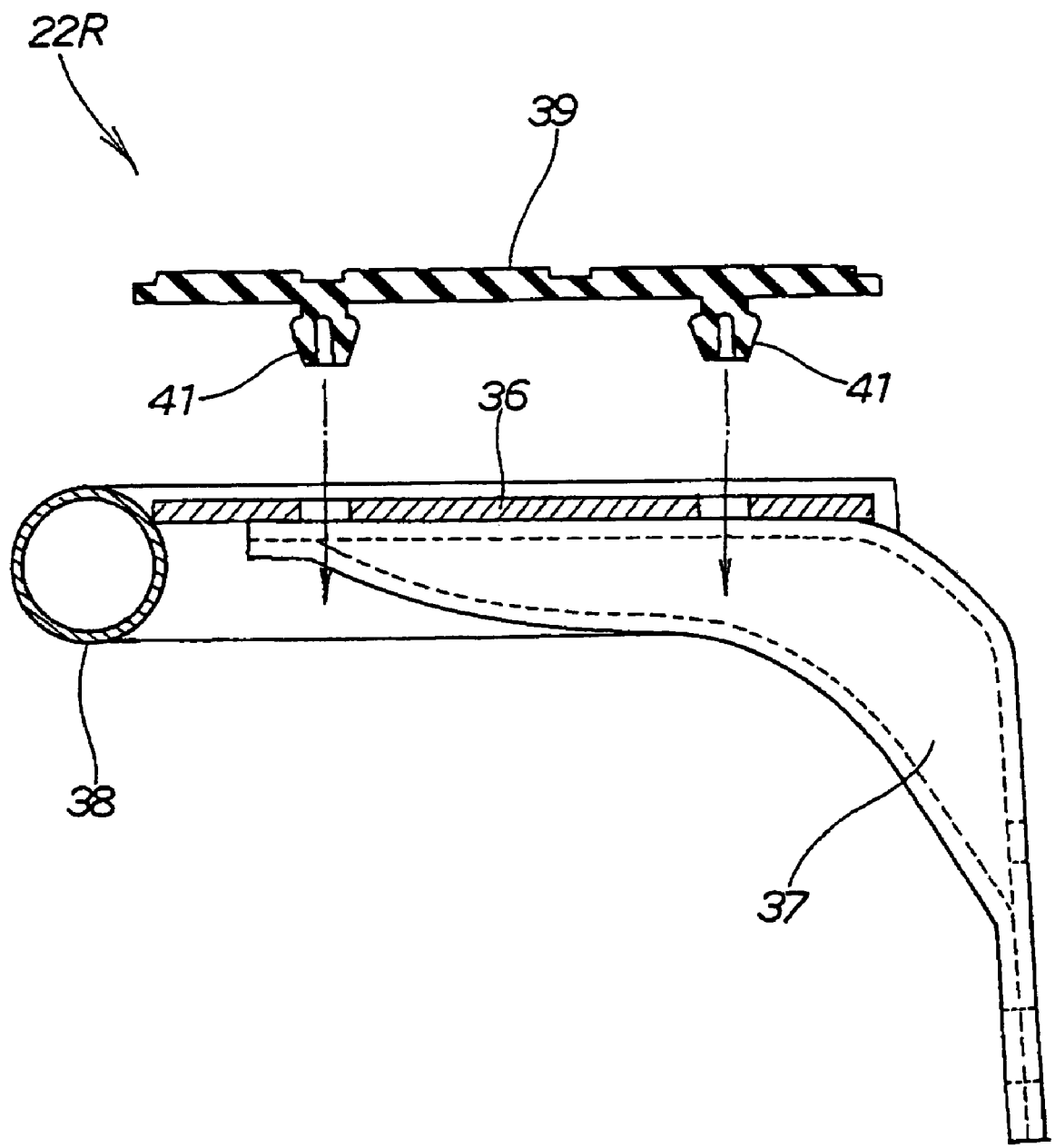
FIG. 4 is a sectional view viewed along a line 4—4 shown in FIG. 3.

FIG. 4 is a sectional view viewed along a line 4—4 in FIG. 3, and shows that the rubber plate 39 is provided with a so-called split latch protrusions 41, . . . in the shape of a bulb ( . . . denotes plural pieces) and the latch protrusions can be attached to the support plate 36 so that they can be detached.

A conventional step of a flat type is sometimes formed by aluminum die-casting. Die-casting is preferred because die-casting provides an excellent appearance and in a medium size or smaller vehicle, a reduction with respect to the cost is also provided.

A step assembled by welding a steel plate may also be adopted. However, the step does not compare to an aluminum die-cast step in weight and appearance.

In the meantime, as for the steps 22L, 22R according to the present invention, the pipe 38 surrounds the periphery of the support plate 36. The pipe 38 functions as a reinforcement of the support plate 36 and the support plate 36 can be thinned and lightened. As a result, the step can be lightened and the cost can be reduced, thus, maintaining the appearance and quality of the steps 22L, 22R, compared with the die-cast step.

In addition, as the step 22 according to the present invention can be manufactured by cutting a steel product, applying plastic working such as bending and drawing to a cut steel product piece and welding the pieces, a metal mold and a die-casting machine are not required and the manufacturing cost can be reduced, compared with the die-cast step.

Figure 5:
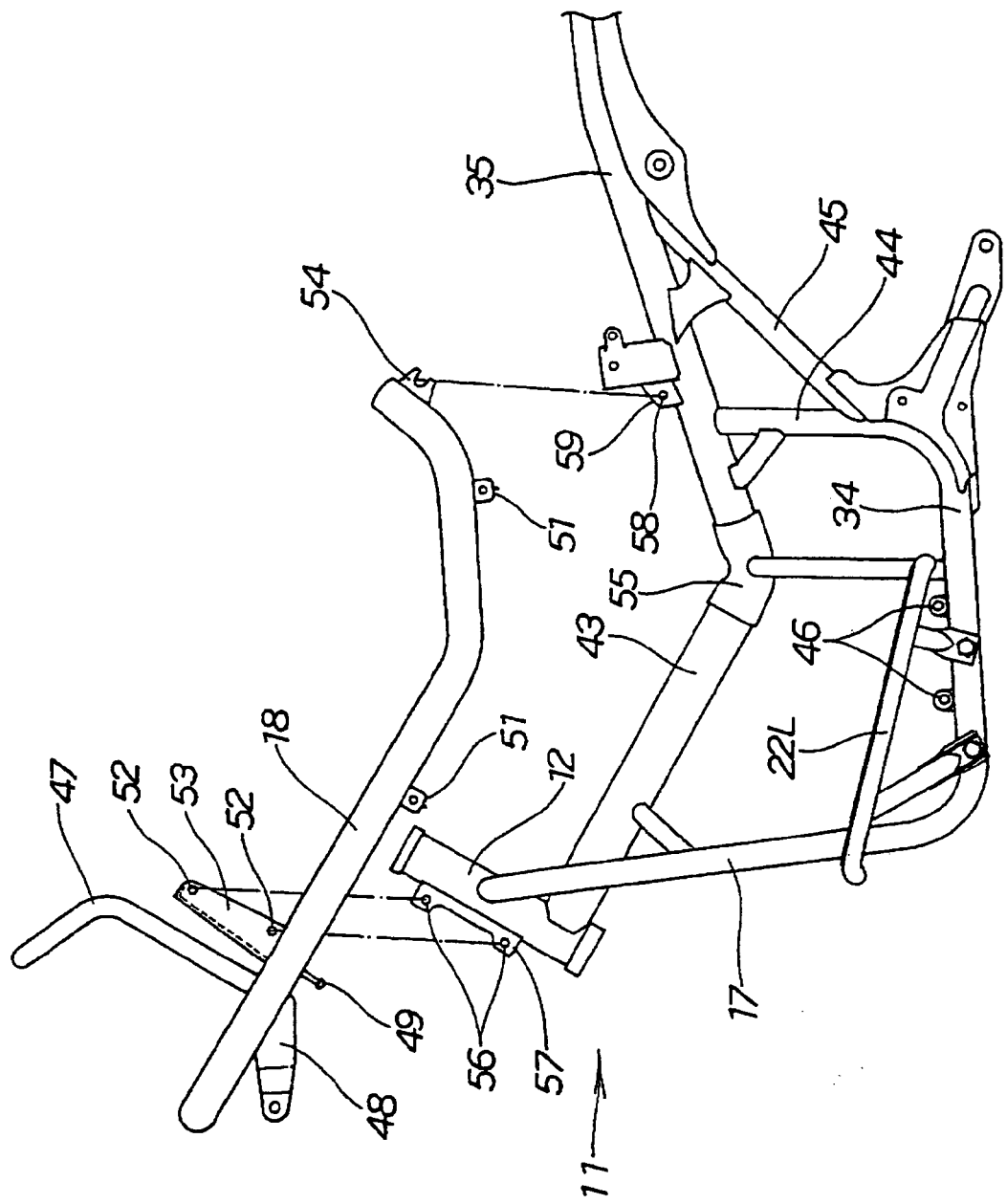
FIG. 5 is an exploded view showing a body frame of the scooter-type vehicle according to the invention.

FIG. 5 is an exploded view showing the body frame of the scooter-type vehicle according to the present invention. The body frame 11 is composed of a main frame 43 extending from the head pipe 12 and being V-type or U-shaped when the main frame is viewed from the side, the rear frame 35 forms the rear of the main frame 43 or extends rearwardly from the main frame. The down tube 17 extends downwardly from the head pipe 12 with a lower pipe 34 succeeding the down tube 17 and extending substantially horizontally with a center frame 44 rising from the rear end of the lower pipe 34 and a stay 45 connecting the center frame 44 and the rear frame 35. Cover locking plates 46, 46 are provided on the lower pipe 34.

In FIG. 5, another frame 18 is shown with the upper side separated.

The details of another frame 18 will be described next and the details of the body frame 11 will be described in relation to FIG. 23 later.

Another frame 18 is provided with a luggage bearing pipe 47 on the top face of the front and lamp supporting brackets 48. A luggage hanging hook 49 is provided on the lower surface of the front with cover locking plates 51, 51 being provided on the lower surface. A bracket 53 includes holes 52, 52 on the top face of the front, and is provided with a U-shaped bracket 54 on the lower surface of the rear.

In the meantime, a front plate 57 having holes 56, 56 is provided to the front face of the head pipe 12 and a rear plate 59 having a hole 58 is provided to the top face of the front of the rear frame 35.

The rear plate 59 is arranged in the vicinity of a connection 55 of the main frame 43 and the rear frame 35. The connection 55 is a part in which one main frame 43 and the two rear frames 35 aggregate and are rigid. If the rear plate 59 is provided in the vicinity (in this embodiment, at the back) of the rigid connection 55, the rear plate is advantageous in strength in supporting the frame 18.

The frame 18 can be integrated with the head pipe 12 and the main frame 43 by fastening the bracket 53 to the front plate 57 by bolts and fastening the U-shaped bracket 54 to the rear plate 59 by a bolt. The configuration after integration will be described in relation to FIG. 7.

Figure 6:
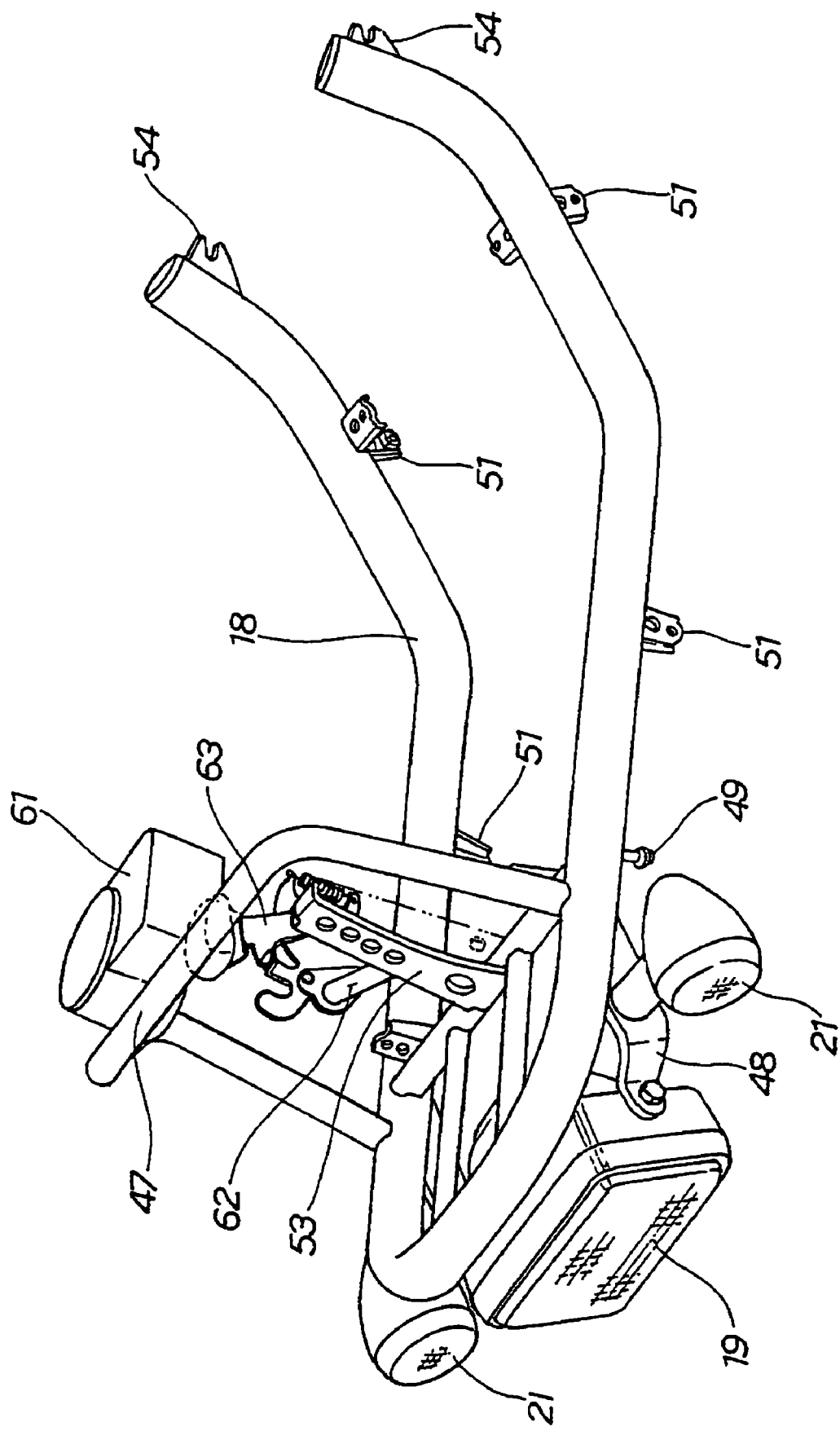
FIG. 6 is an explanatory drawing for explaining the action of another frame according to the invention.

FIG. 6 is an explanatory drawing for explaining the action of the frame 18 according to the present invention. The frame 18 is a pipe frame which is U-shaped when viewed from the top and is a useful frame where the turn signal lamps 21, 21 and the headlamp 19 can be attached to the lamps supporting bracket 48. A meter unit 61 can be attached to the luggage bearing pipe 47 and parking brake levers 63 can be attached to the right side of the bracket 53 via a stay 62.

In addition, the assembly time required for an assembly line can be reduced by assembling the vehicular parts such as the frame 18, the turn signal lamp 21, the headlamp 19, the meter unit 61 and the parking brake levers 63 for example beforehand (called a small assembly) and attaching the small assembly (FIG. 6 itself) to the head pipe 12 and the main frame 43, respectively, as shown in FIG. 5.

Figure 7:
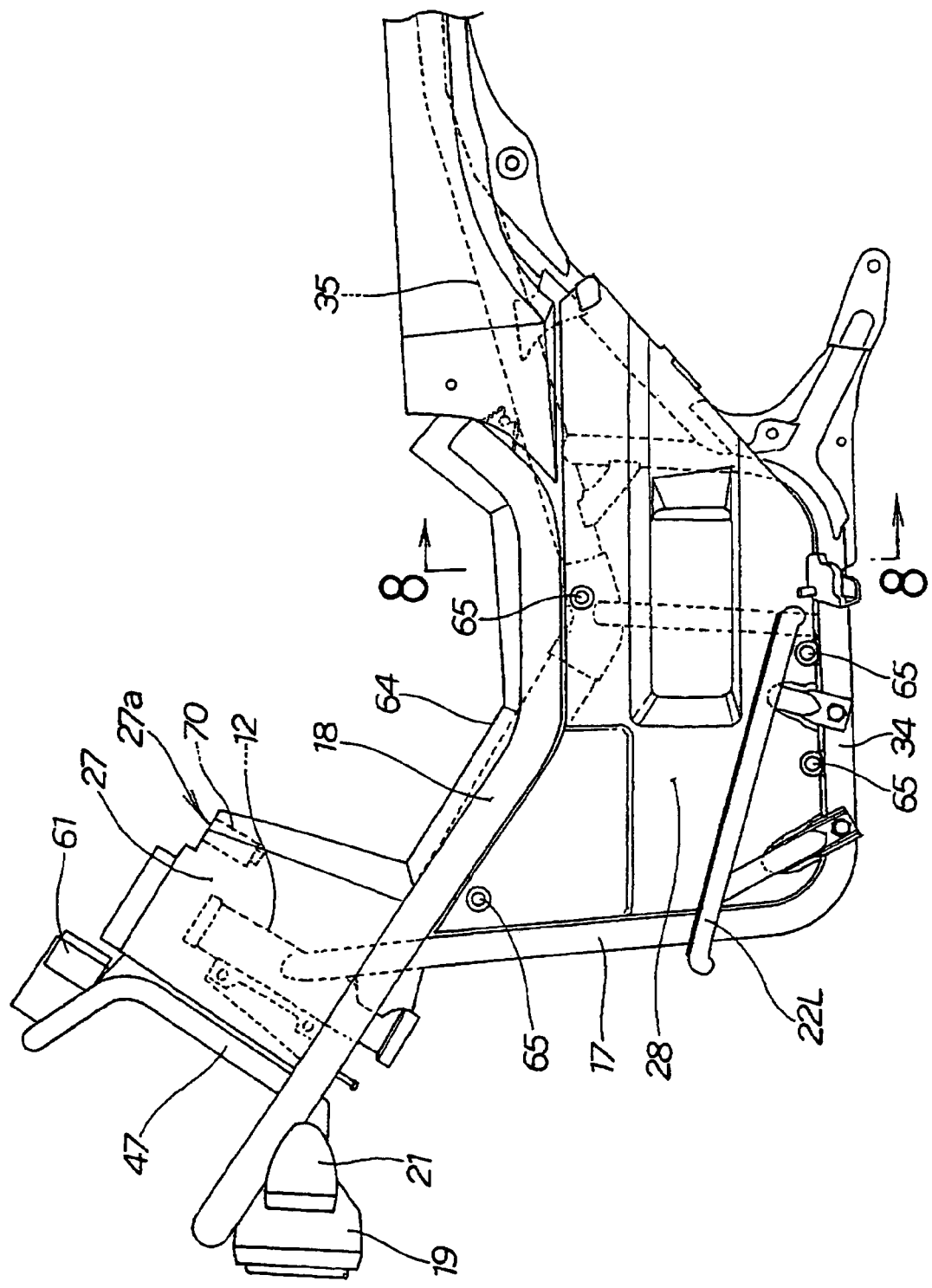
FIG. 7 is a side view showing the body frame of the scooter-type vehicle according to the invention.

FIG. 7 is a side view showing the body frame of the scooter-type vehicle according to the present invention that illustrates the frame 18 being attached to the head pipe 12 and the rear frame 35. The handlebar post cover 27 is integrated with a center cover 64 with the side cover 28 being attached between another the 18 and the lower pipe 34 by bolts 65, . . . and the step 22L is attached to the lower pipe 34.

A structure is adopted wherein the front face of the handlebar post cover 27 is flat as shown in FIG. 7 and front loading space is sufficiently secured.

A shelf 27a that is lower in a level by a step is formed in the rear and on the upside of the handlebar post cover 27. A combination locking device 70 (the detailed structure will be described later) is attached on the shelf 27a.

Figure 8:
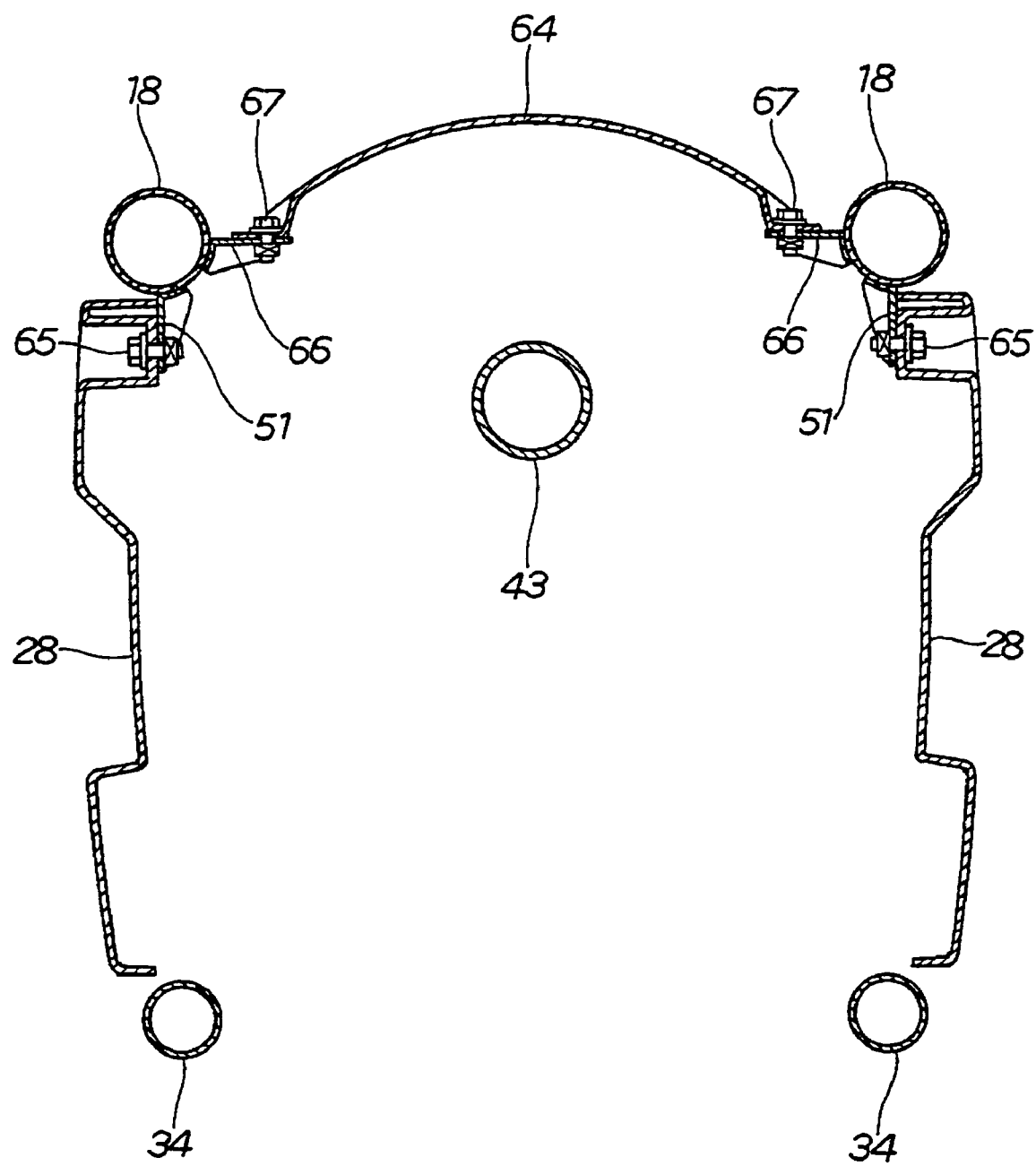
FIG. 8 is a sectional view viewed along a line 8—8 shown in FIG. 7.

FIG. 8 is a sectional view viewed along a line 8—8 shown in FIG. 7 that illustrates the center cover 64 that is attached to cover locking plates 66, 66 provided on the frame 18 by bolts 67, 66. The side covers 28, 28 are attached to the cover locking plates 51, 51 by the bolts 65, 65.

In the case where the center cover 64 and the side covers 28, 28 are attached to the main frame 43 by bolts, large-scale brackets for attaching the covers are required.

The frames 18, 18 (though the frame 18 is one, two reference numbers are allocated for convenience) are arranged over the right and left lower pipes 34, 34 and the center cover 64 and the side covers 28, 28 are cleverly attached utilizing the frames 18, 18.

As a result, the frames 18, 18 can be utilized for fixing luggage and other items. In addition, as the center cover 64 and the side covers 28, 28 (these are called the body cover) are arranged inside the frames 18, 18 and the right and left lower pipes 34, 34, the body cover can be made compact as a whole. Thus, the body cover can be lightened with a reduction in the cost being achieved.

Further, as the box type body cover is encircled by the frames 18, 18 and the lower pipes 34, 34, the outline like a container of a pipe frame can be formed as a whole and the appearance quality can be enhanced.

Besides, as is clear from the drawing, no large-scale bracket for attaching the cover is required and the manufacturing cost of the body frame can be reduced.

Next, a handlebar locking mechanism provided for preventing theft will be described. However, in the present invention, the so-called combination locking device in which the handlebar locking mechanism is built in a combination switch is adopted.

Figure 9:
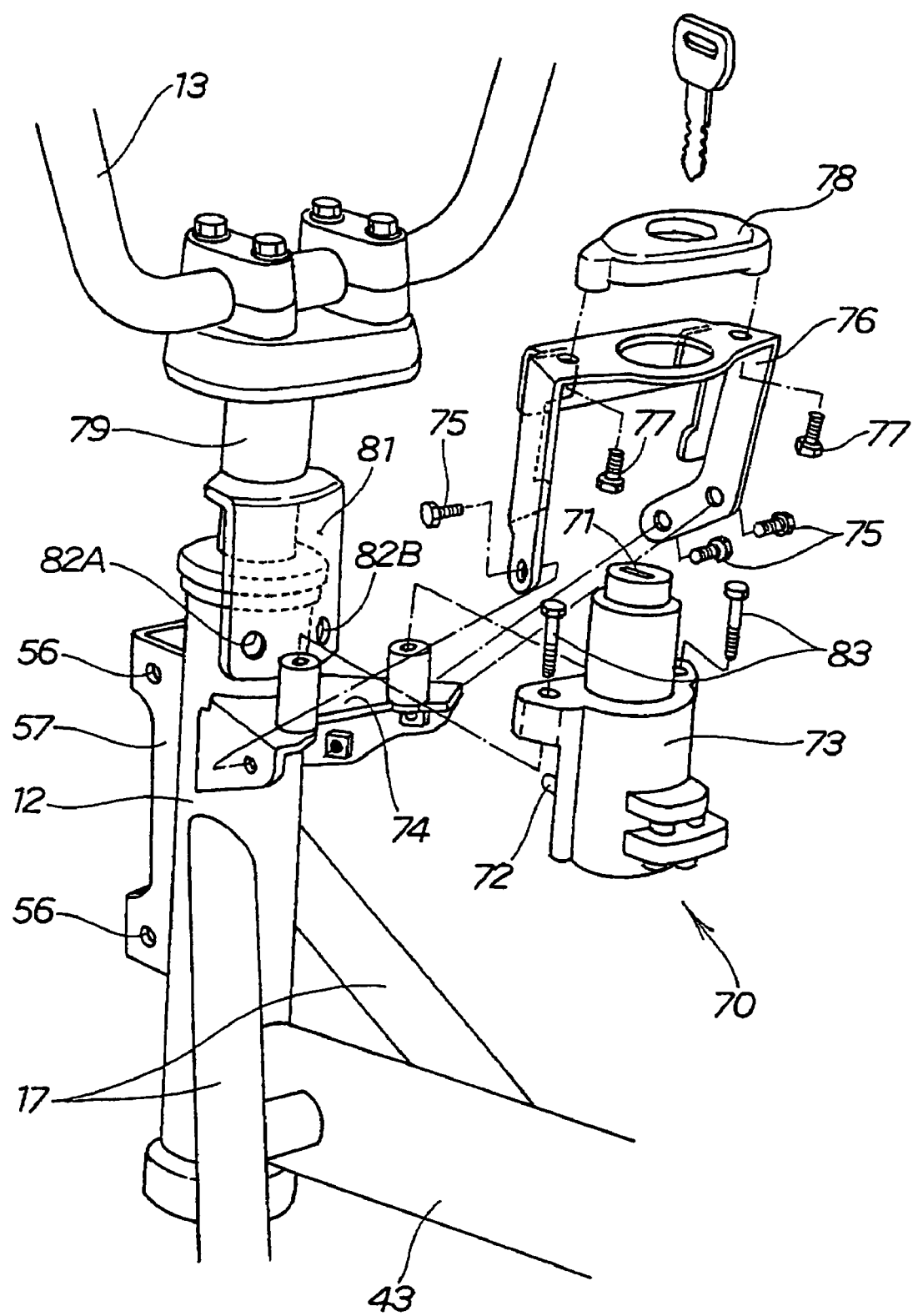
FIG. 9 is an exploded perspective view showing a combination locking device according to the invention.

FIG. 9 is an exploded perspective view showing the combination locking device according to the present invention. The combination locking device 70 is composed of a key hole 71, switches (not shown because they are built in), a combination locking unit 73 is provided with a pin letting-in/out mechanism (not shown because it is built in) for letting in and letting out a lock pin 72. A unit supporting bracket 74 is provided for attaching the combination locking unit 73 to the head pipe 12 with an arched bracket 76 fixed to the unit supporting bracket 74 by three machine screws 75, . . . . A shutter housing 78 is fixed to the arched bracket 76 by bolts 77, 77 that are screwed from the downside and a lock plate 81 is welded and fixed to a steering shaft 79.

The lock plate 81 is provided with two lock holes 82A, 82B. As the head pipe 12 is a non-rotary member and the steering shaft 79 is a rotary member, the handlebar can be locked by locking the side of the steering shaft 79 on the side of the head pipe 12. It is the combination locking device 70 according to the present invention that is based upon this principle.

To achieve the principle, the combination locking unit 73 is fixed to the unit supporting bracket 74 provided to the back of the head pipe 12 by bolts 83, 83. The arched bracket 76 is attached so that the arched bracket 76 covers the combination locking unit 73. It is desirable that the shutter housing 78 is fixed to the arched bracket 76 by the bolts beforehand.

Figure 10:
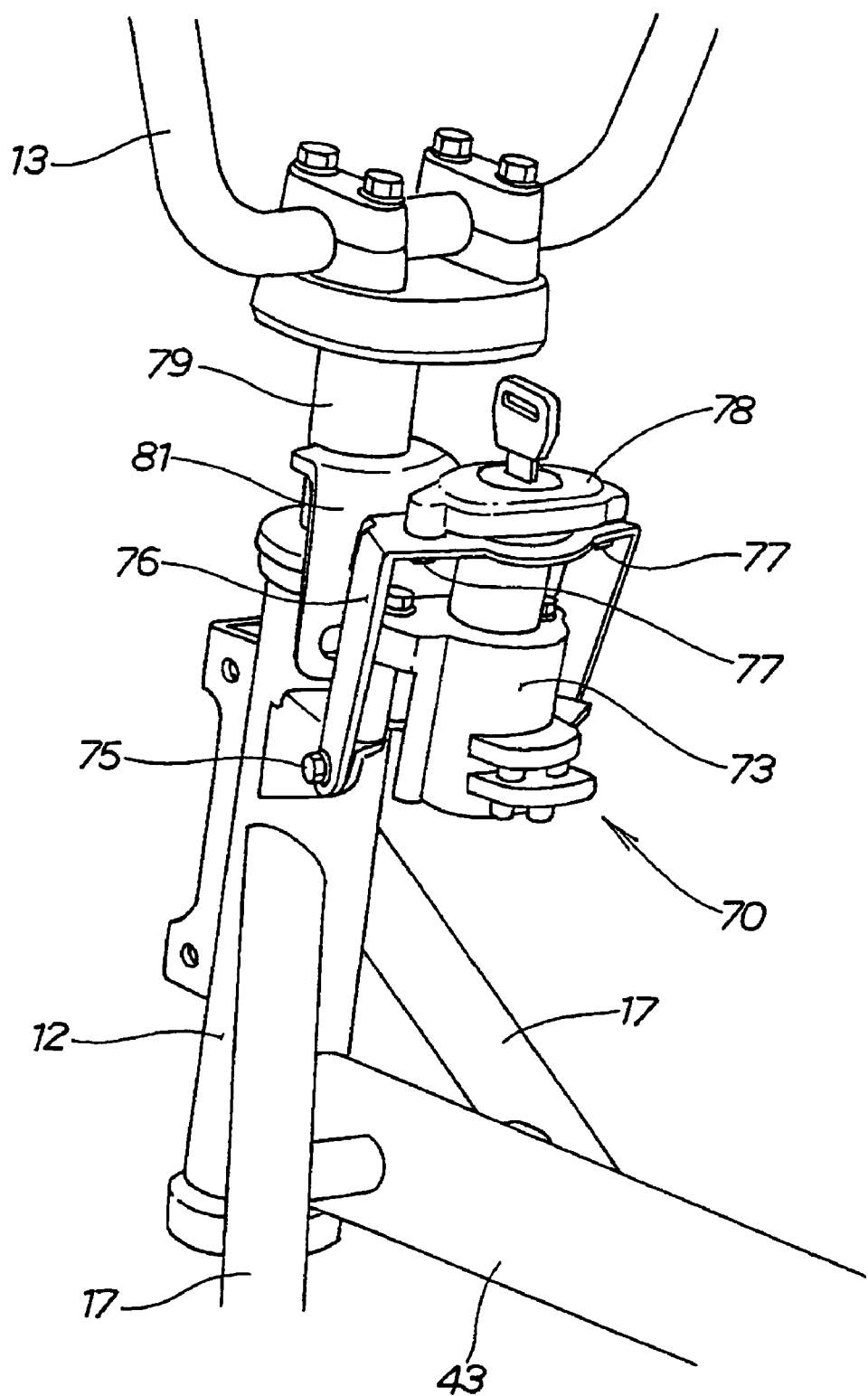
FIG. 10 is a perspective view showing the combination locking device according to the invention.

FIG. 10 is a perspective view showing the combination locking device according to the present invention and the combination locking device is characterized in that the shutter housing 78 is put on the arched bracket 76 attached so that the arched bracket covers the combination locking unit 73 and the shutter housing 78 is fixed by the bolts 77, 77 screwed from the downside.

As shown in FIG. 7, the head pipe 12 and the steering shaft 79 are covered with the handlebar post cover 27. As a result, most of the combination locking device 70 shown in FIG. 10 is covered with the handlebar post cover and only the shutter housing 78 is exposed. As the bolts 77, 77 disappear and the heads of the bolts 77, 77 are located on the downside, these bolts 77, 77 cannot be unscrewed easily from the upside. As a result, the shutter housing 78 is difficult to detach and there is no fear of the combination locking unit 73 being damaged.

Figure 11C:
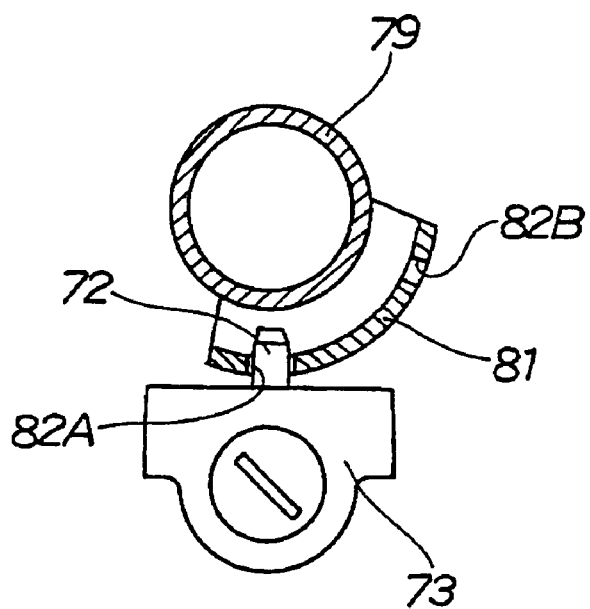
Figure 11C:
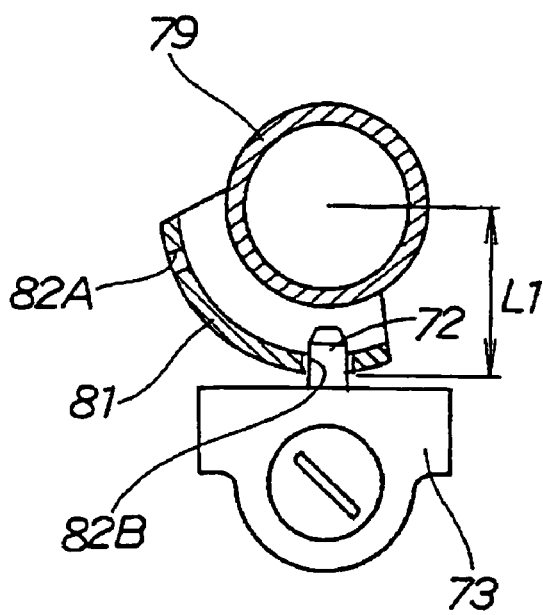
Figure 11C:
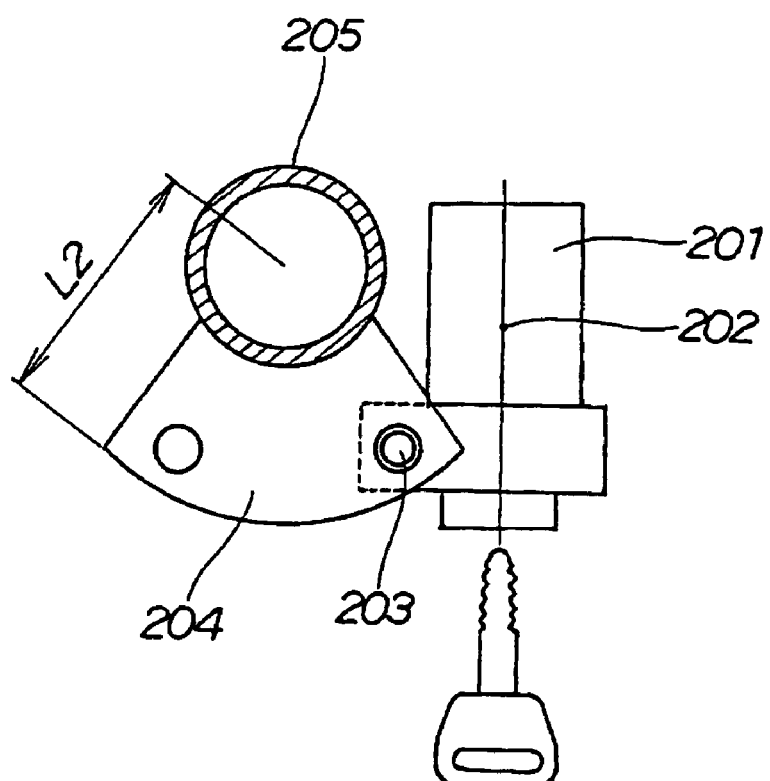

FIGS. 11(a) to 11(c) show the new and conventional type combination locking devices. FIGS. 11(a) and 11 (b) show the action of the present invention and FIG. 11(c) shows the action of the conventional type.

FIG. 11(a) shows a state in which the steering shaft 79 is turned to the left substantially in a full turn with the lock pin 72 being inserted into the lock hole 82A.

FIG. 11(b) shows a state in which the steering shaft 79 is turned to the right substantially in full turn with the lock pin 72 being inserted into the lock hole 82B.

FIG. 11(b) is characterized in that the longitudinal axis of the combination locking unit 73 extends in a direction along the two sides of the drawing, the longitudinal axis is made substantially parallel to the steering shaft 79 and the lock pin 72 is leveled. As a result, distance L1 from the center of the steering shaft 79 to the outside face of the lock plate 81 can be set to be shorter.

FIG. 11(c) shows a conventional type locking mechanism in which the longitudinal axis 202 of a combination locking unit 201 (reference numbers between 200 and 300 are allocated to conventional types and comparative examples) is leveled, a lock pin 203 is vertically moved and a lock plate 204 is formed by a fan-shaped plate. Distance L2 from the center of a steering shaft 205 to the outside face of the lock plate 204 is longer. In addition, as the area as viewed from the top of the lock plate 204 and the combination locking unit 201 is large, other equipment is difficult to arrange around the steering shaft 205.

In the meantime, in the combination locking device according to the present invention shown in FIGS. 11(a) and 11(b), other equipment can be easily arranged around the steering shaft 79.

Next, the details of the rider's seat 25 and the seat back that also functions as the passenger seat 26 according to the present invention will be described.

Figure 12:
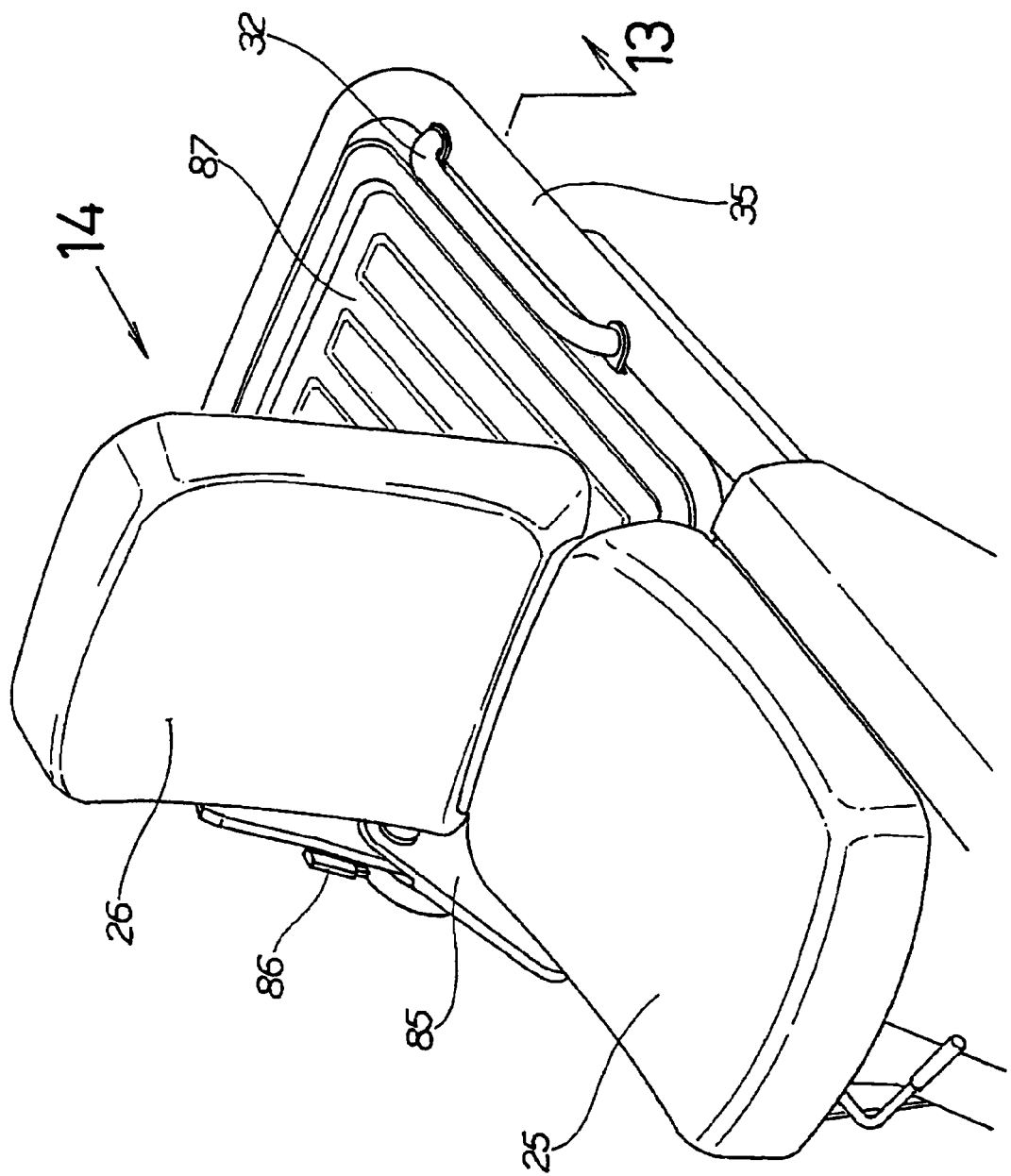
FIG. 12 is a perspective view showing a rear loading space according to the invention.

FIG. 12 is a perspective view showing a rear loading space according to the present invention with the rider's seat 25 being changed to a seat provided with a backrest by raising the seat back that also functions as the passenger seat 26. An angle of the seat back that also functions as the passenger seat 26 can be varied by operating a lock lever 86 attached to a link 85.

FIG. 12 also shows that the rear loading space 87 and the grab rail 32 are attached to the rear frame 35.

The rear loading space 87 is formed by an irregular plate made of resin or light metal. In the case of the irregular plate, the section modulus can be greatly increased, compared with a flat plate and more luggage can be loaded.

Figure 13:
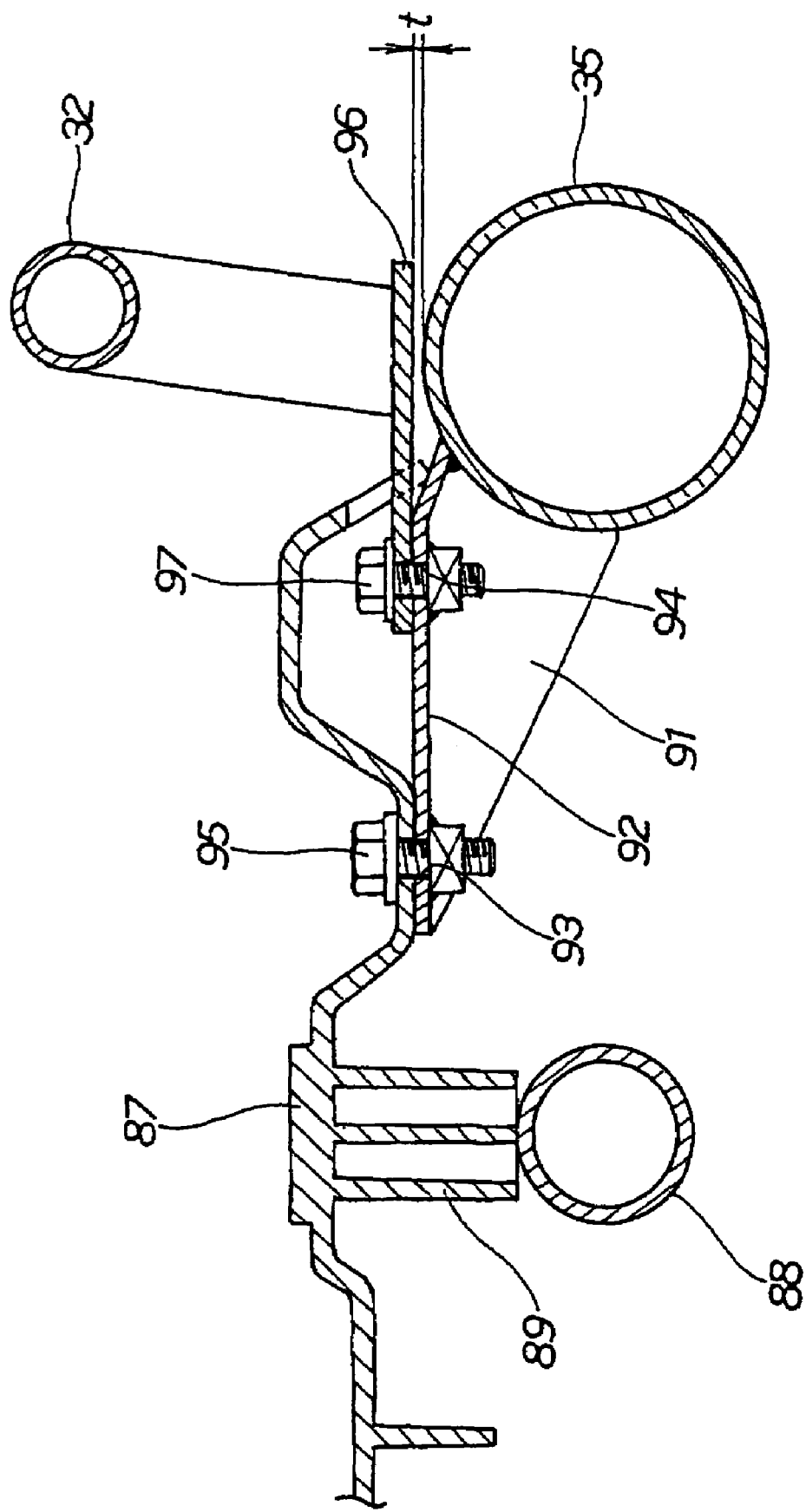
FIG. 13 is a sectional view taken along line 13 shown in FIG. 12.

FIG. 13 is a sectional view viewed taken along line 13 shown in FIG. 12 and illustrating an inside rail 88 that is arranged in parallel to the rear frame 35. On the side of the body center (the left side in FIG. 13) inside the rear frame 35 and a leg 89 is hung from the rear loading space 87 that can be loaded onto the inside rail.

FIG. 13 also shows that a triangular bracket 91 extends from the rear frame 35 in the shape of a round pipe to the side of the body center. Two holes 93, 94 are made on the top plate 92 of the triangular bracket 91 and the rear loading space 87 is fixed to the inside hole 93 by a bolt 95. FIG. 13 further shows that a base 96 of the grab rail 32 is attached to the outside hole 94 by a bolt 97.

The top plate 92 of the triangular bracket 91 is set to a slightly higher value so that the top plate is higher than the top face of the rear frame 35 by a distance t. The distance t is equivalent to 1 to 2 mm. The reason why such structure is adopted is as follows.

In case the structure of the grab rail 32 is in the shape of a round pipe and is directly attached to the rear frame 35 with in the shape of a round pipe being adopted, the lower end of the grab rail 32 is placed on the rear frame 35 and touching parts are welded. In the alternative, in the case when the grab rail and the rear frame are bolted so that the grab rail can be detached, bolted parts are exposed.

Then, in the present invention, the base 96 extends from the lower end of the grab rail 32 and after the end of the base 96 is inserted under the rear loading space 87, the end of the base is bolted on the triangular bracket 91. As the base can be detached and bolted parts disappear, the appearance quality is satisfactory.

However, naturally, force is applied to the grab rail 32 and the base 96 is vertically deflected. The base 96 may interfere with the rear frame 35.

The base 96 may be regarded as being a cantilevered when the deflection is calculated, the distance t is set to a value that exceeds the estimated deflection and the interference is prevented.

Figure 14:
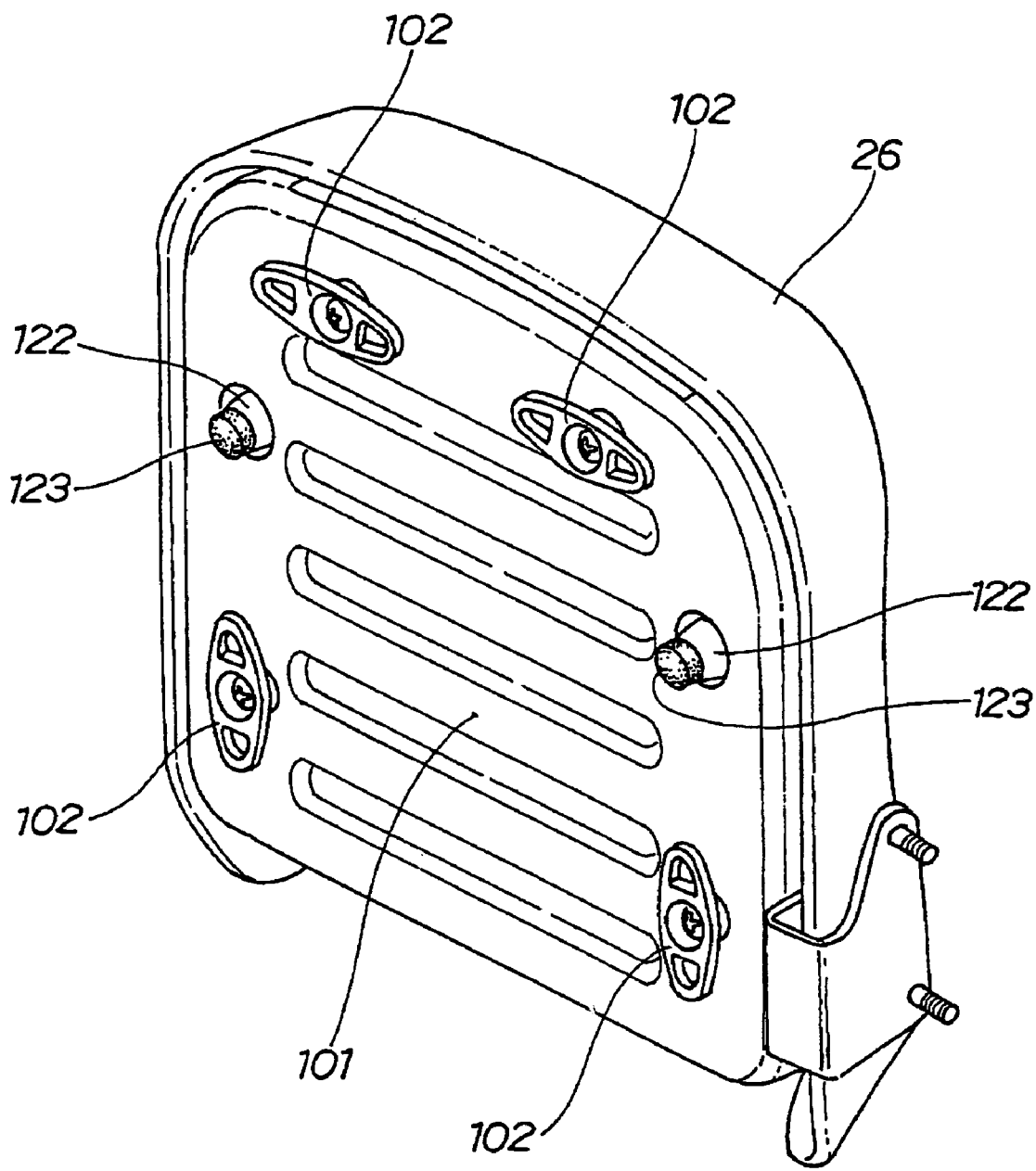
FIG. 14 is a view taken from a direction shown by an arrow 14 in FIG. 12.

FIG. 14 shows the back (the bottom) structure of the seat back that also functions as the passenger seat 26 viewed from a direction shown by an arrow 14 in FIG. 12. The seat back that also functions as the passenger seat 26 includes the bottom plate of the seat (a reference number 98 shown in FIG. 17 described later) with encircling cushion material that is further encircled by a back board 101. The total four pieces of T-type hooks 102, . . . are provided to the upper right, the upper left, the lower right and the lower left for example of the back board 101.

The back board 101 is formed by a fine plate because the back board is exposed when no luggage is loaded on the rear of the body. In addition, as the bending moment by the T-type hooks 102 is applied, the rigidity is required to be enhanced. Then, the back board 101 is made irregular to enhance the section modulus. A steel plate and a resin plate are suitable for the back board 101. As the back board is exposed to the weather, surface treatment such as coating, plating and coloring is applied to the back board.

Figure 15:
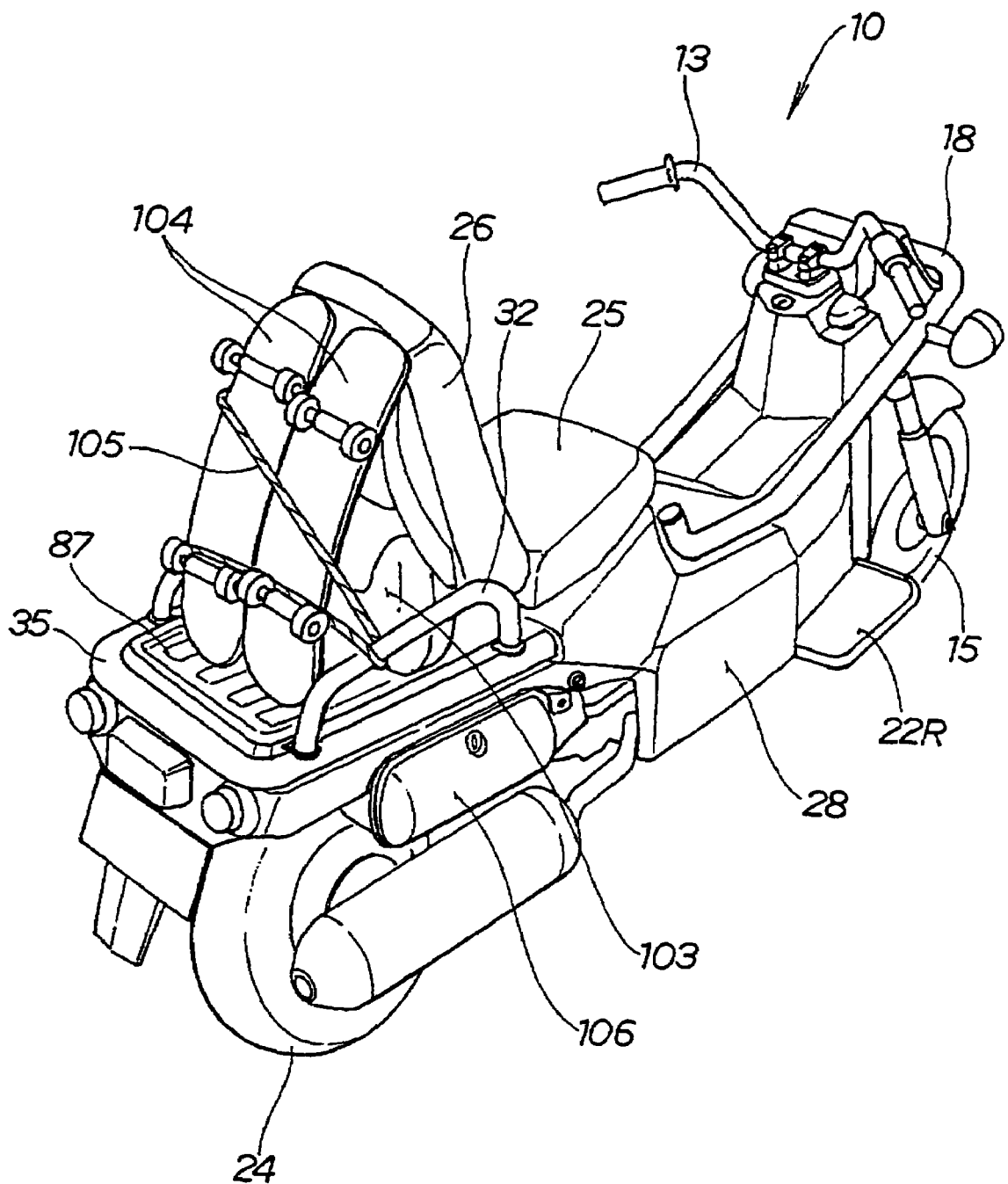
FIG. 15 is a back view showing the scooter-type vehicle according to the invention.

FIG. 15 is a back view showing the scooter-type vehicle according to the present invention and illustrating that a bag 103 and skate boards 104, 104 are loaded onto the rear loading space 87. The luggage is fixed by fastening a rope 105 to the grab rail 32 and the seat back that also functions as the passenger seat 26 (the T-type hook are not shown).

In case the rear loading space 87 is horizontal, luggage is longitudinally moved by full braking. In the present invention, the forward movement of luggage can be prevented because the seat back that also functions as the passenger seat 26 exists and the backward movement can be prevented by fastening the rope 105 to the T-type hook not shown.

Hereby, a large quantity of luggage is loaded onto the rear loading space 87 and can be stably carried.

A glove compartment 106 is provided on the right side of the rear loading space 87. However, the glove compartment 106 will be described in detail later.

Figure 16:
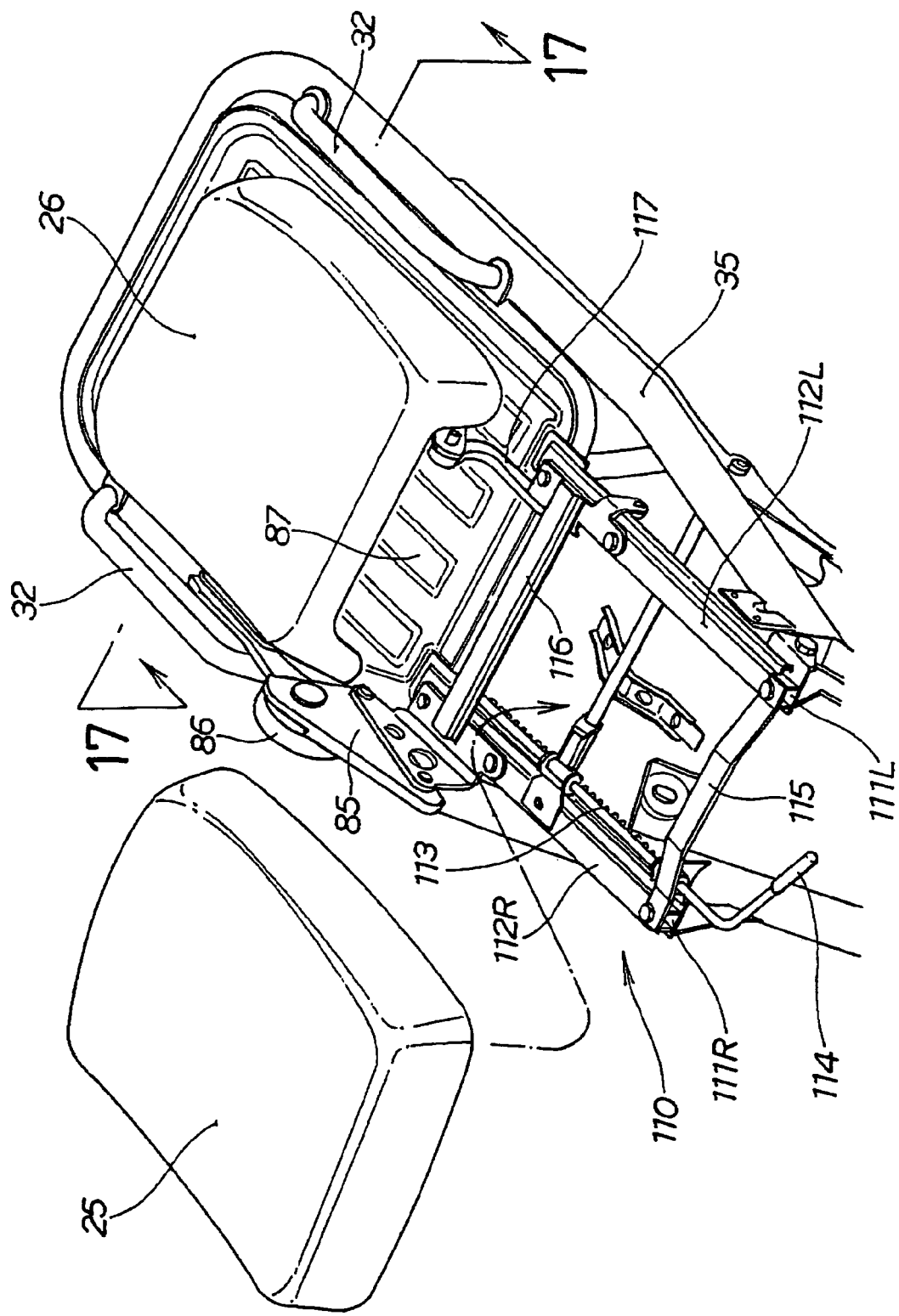
FIG. 16 is an explanatory drawing for explaining a seat sliding mechanism adopted in the invention.

FIG. 16 is an explanatory drawing for explaining a seat sliding mechanism adopted in the present invention, the longitudinal position of the rider's seat 25 according to the present invention can be changed according to a rider's liking. To permit the adjustment, the seat sliding mechanism 110 is provided to the rear of the body.

The seat sliding mechanism 110 is composed of left and right seat rails 111L, 111R, left and right sliders 112L, 112R attached to these seat rails 111L, 111R so that the sliders can be longitudinally slid, a serrate member 113 provided to the right slider 112R for locking a slide, an operating lever 114 for turning the serrate member 113 and switching to a locked state/a locking released state, front and rear cross members 115, 116 for coupling the left and right sliders 112L, 112R, a connecting link 85 extending from the rear of the right slider 112R and a link 117 extending from the rear of the left slider 112L.

The left and right sliders 112L, 112R can be freely longitudinally moved.

The rider's seat 25 is fixed to the left and right sliders 112L, 112R and the seat back that also functions as the passenger seat 26 is fixed to the connecting link 85 and the link 117. As a result, the rider releases the slide lock by operating the operating lever 114, and the rider's seat 25 and the seat back that also functions as the passenger seat 26 can be fixed to the following arbitrary longitudinal positions by moving the rider's seat 25 and the seat back that also functions as the passenger seat 26 in respective arbitrary longitudinal positions and restoring the operating lever 114 to an original position.

Further, the seat back that also functions as the passenger seat 26 can be made horizontal as shown in FIG. 16 by the rider or a passenger operating the lock lever 86.

Figure 17:
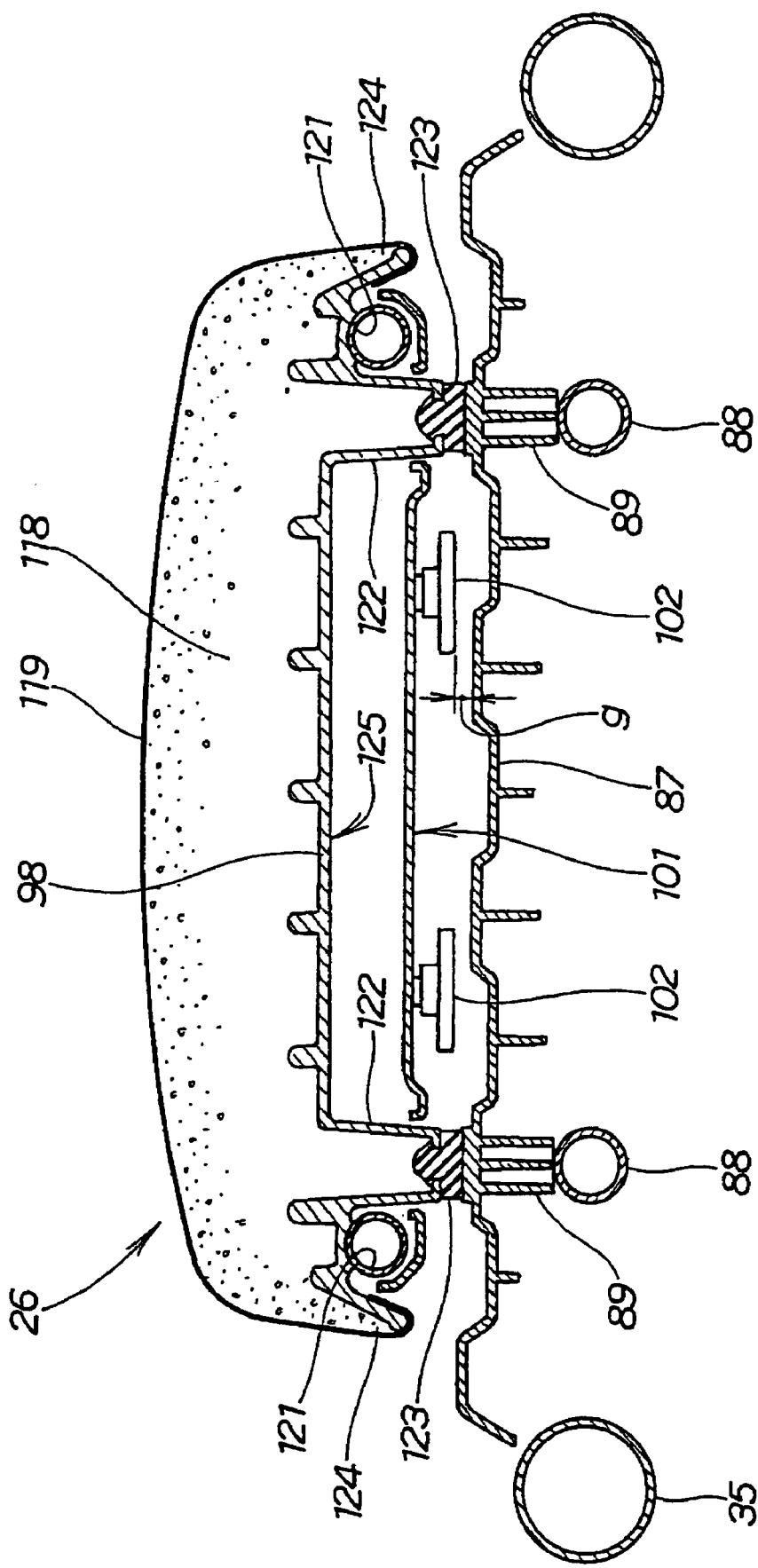
FIG. 17 is a sectional view taken along a line 17—17 shown in FIG. 16, a grab rail is omitted.

FIG. 17 is a sectional view viewed along a line 17—17 shown in FIG. 16 (the grab rail is omitted), to explain the sectional structure of the seat back that also functions as the passenger seat 26. First, the seat back that also functions as the passenger seat 26 is basically composed of cushion material 118 such as a sponge material, facing 119 and a seat bottom plate 98. A reinforcement 121 is added to the seat bottom plate 98. Legs 122, 122 extend from the seat bottom plate 98, and pads 123, 123 are attached to each end (each lower end in FIG. 17) of the legs 122, 122.

The reinforcement 121 is coupled to the link 117 shown in FIG. 16.

As for the seat bottom plate 98, edges 124, 124 are swollen downward to give a feeling of thickness to the seat and a concave portion 125 is formed in the center. The concave portion 125 and the reinforcement 121 are collectively covered with the back board 101 so as to enhance the appearance quality when the seat back that also functions as the passenger seat 26 is raised.

The legs 122, 122 protrude in positions matching with the right and left inside rails 88, 88. Thereby, the weight of the passenger can be directly supported by the inside rails 88, 88 via the legs 122, 122 and the legs 89, 89 of the rear loading space 87. Only a compressive force acts on the legs 89, 89 of the rear loading space 87 and no bending moment acts on the rear loading space 87.

The T-type hooks 102, 102 are set to a height at which a clearance g can be secured from the rear loading space 87. The clearance g is equivalent to 4 to 5 mm.

Generally, in a small-sized vehicle, a hook on a loading space which can be inclined and a hook on a loading space which can be housed may be adopted. The reason is that as the hooks can be housed when they are not used, the appearance can be kept satisfactory and as they are pulled out when they are used, they can be large-sized and space for fastening a rope is increased.

However, when the seat back that also functions as the passenger seat 26 is pushed down by mistake in a state in which the hook which can be inclined and the hook which can be housed are not inclined or not housed, the rear loading space 87 may be damaged and the hooks may be also damaged.

In the meantime, in the present invention, a fixed hook is adopted. The fixed hook is not required to be inclined/housed and does not damage a related part. However, as space for attaching the hook is limited, the a large size for the hook is not desired. Thus, the T-type hook 102 is adopted. As for the T-type hook, two right and left pawls can be secured on a crossbar of the T with a vertical bar of the T as the center. A rope can be sufficiently fastened onto the vertical bar and the two right and left pawls. That is, a space is provided for fastening a rope that is larger though the T-type hook is smaller in size compared to an L-type hook.

Next, the details of the glove compartment 106 provided under the right side of the rear loading space will be described.

Figure 18:
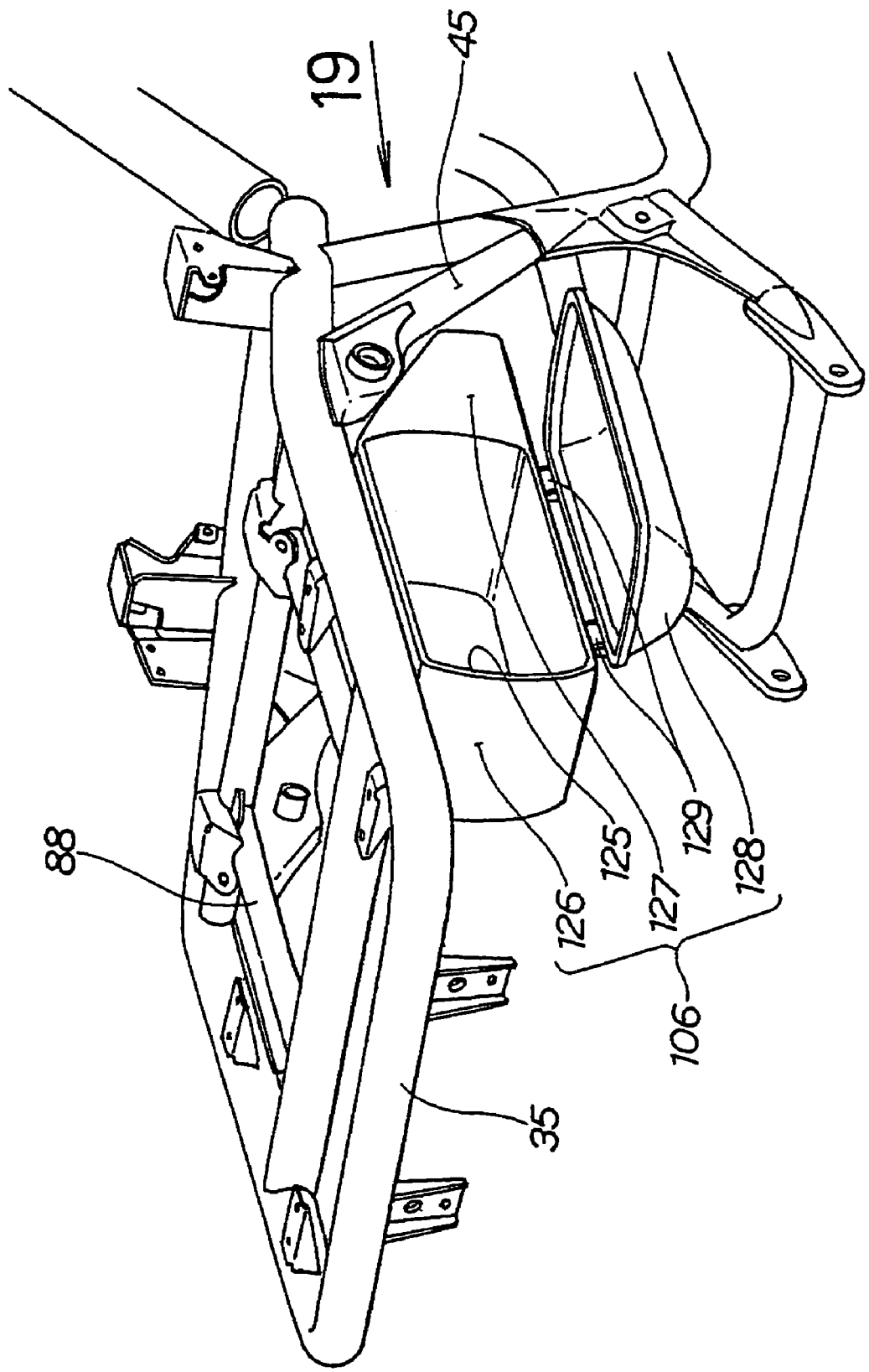
FIG. 18 is a perspective view showing a glove compartment according to the invention.

FIG. 18 is a perspective view showing the glove compartment according to the present invention, and the glove compartment 106 is composed of a container 126 provided with a transverse opening 125, a flange 127 protruding forward in the body from the edge of the opening 125 of the glove compartment container 126, a lid 128 for closing the opening 125 and hinges 129, 129 for coupling the lid 128 to the lower edge of the opening 125.

The glove compartment 106 is attached to the body by attaching the container 126 to the rear frame 35.

Figure 19:
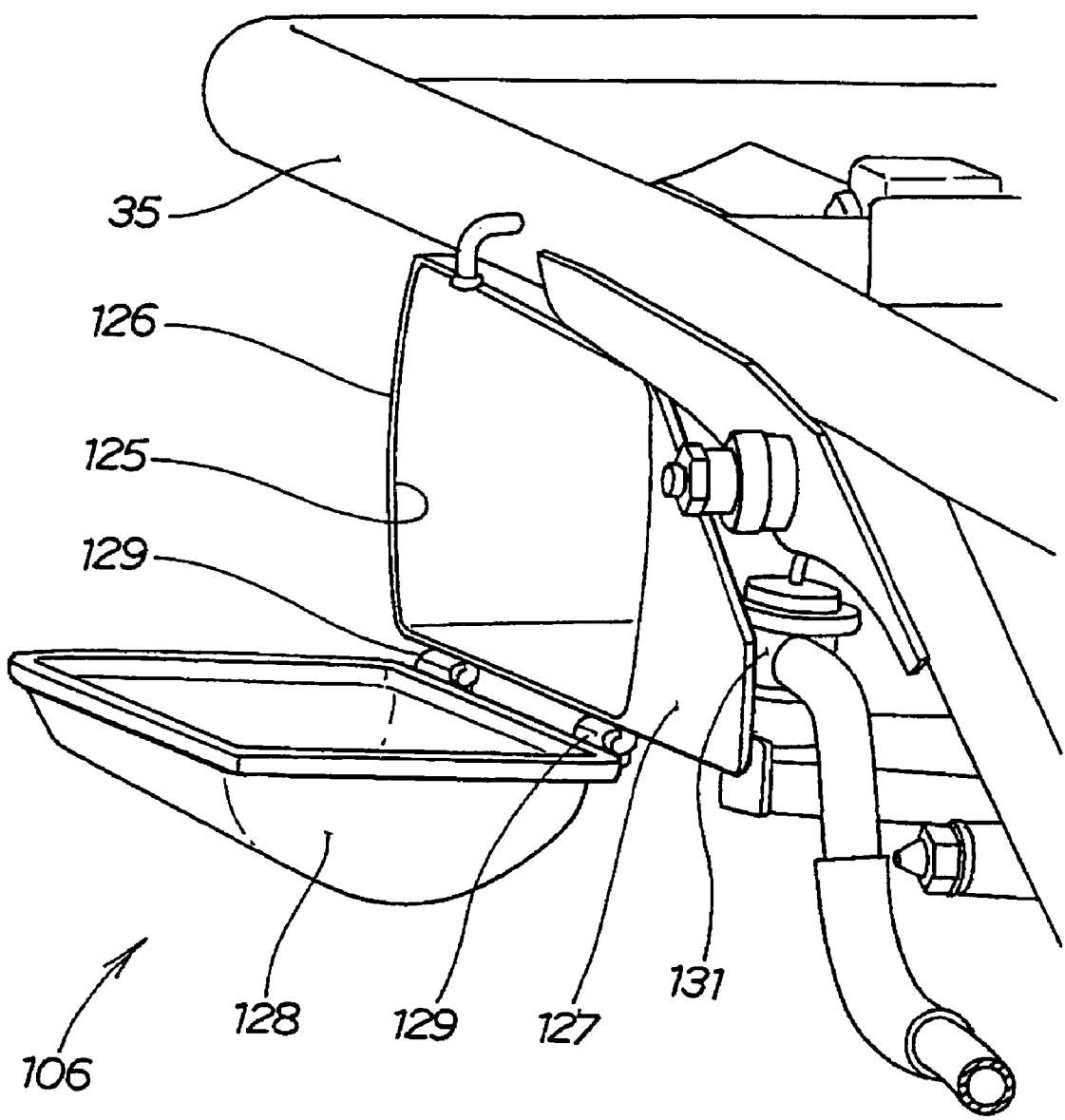
FIG. 19 is a view taken from a direction shown by an arrow 19 in FIG. 18.

FIG. 19 is a view viewed from a direction shown by an arrow 19 in FIG. 18 and illustrates that a secondary air control valve 131 is arranged behind the flange 127 of the glove compartment 106. The secondary air control valve 131 is important equipment for cleaning exhaust gas by accelerating the combustion of exhaust gas by supplying suitable quantity of air to an exhaust system of an engine and burning any unburned gas component left in the exhaust gas.

The important secondary air control valve 131 is generally housed in a body cover in a scooter-type vehicle.

In this embodiment, the secondary air control valve 131 is not housed in the body cover such as the side cover.

In this case, to correspond to a stepping stone from the outside, the secondary air control valve 131 is required to be covered with a dedicated protective cover. In this case, the dedicated protective cover, mounting brackets and machine screws are required and the number of parts increases.

In the present invention, the flange 127 projects from the glove compartment 106 arranged in the vicinity and the secondary air control valve 131 and is protected by the flange 127. As a result, no dedicated protective cover, no mounting bracket and no machine screws are not required to be provided and the number of parts can be reduced. In addition, as the secondary air control valve 131 is arranged outside the body cover, the maintenance, the checking and the replacement of the secondary air control valve 131 can be made only by detaching the glove compartment 106.

Next, a protective cover of an intake port of an air cleaner will be described.

Figure 20A:
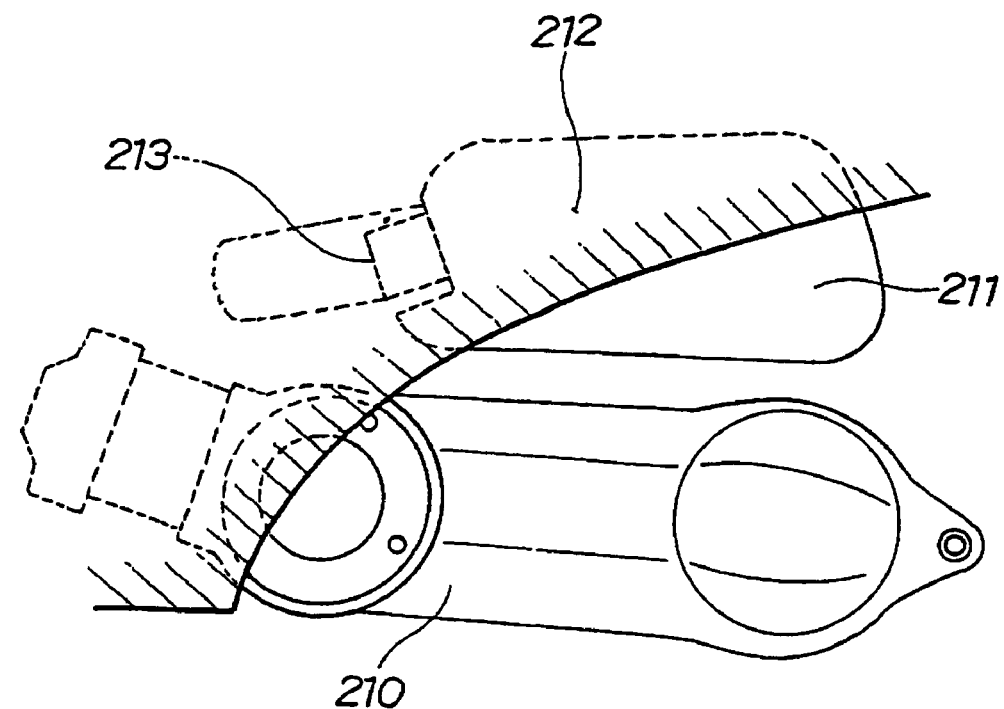
FIGS. 20(a) and 20(b) are side views respectively showing an air cleaner and a power unit.
Figure 20B:
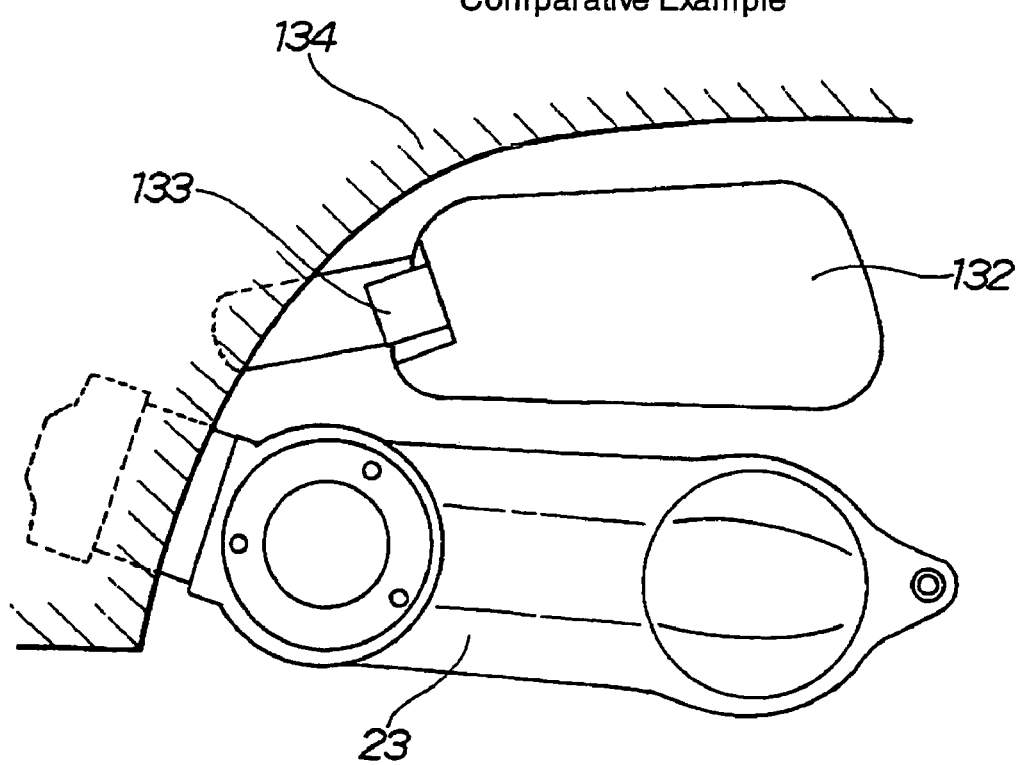

FIGS. 20(a) and 20(b) are sides views showing the air cleaner and the power unit. FIG. 20(a) shows a comparative example and FIG. 20(b) shows an embodiment.

In the comparative example shown in FIG. 20(a), an air cleaner 211 is arranged over a power unit 210 and an intake port 213 of the air cleaner 211 is covered with a body cover 212. In a general scooter-type vehicle, such structure is mainly adopted.

In the embodiment shown in FIG. 20(b), an air cleaner 132 is arranged over the power unit 23 and an intake port 133 of the air cleaner 132 is not covered with a body cover 134. Though the body cover 134 can be small in size, foreign matter such as a stone, sand and mud, respectively, from this side of the drawing easily enters the intake port 133 on the other hand and therefore, a covering measure is required. In the case where an intake port cover for the measure is provided, a cover supporting bracket for the intake port cover is required. However, as the cover supporting bracket increases the number of parts, it is not desirable.

Figure 21:
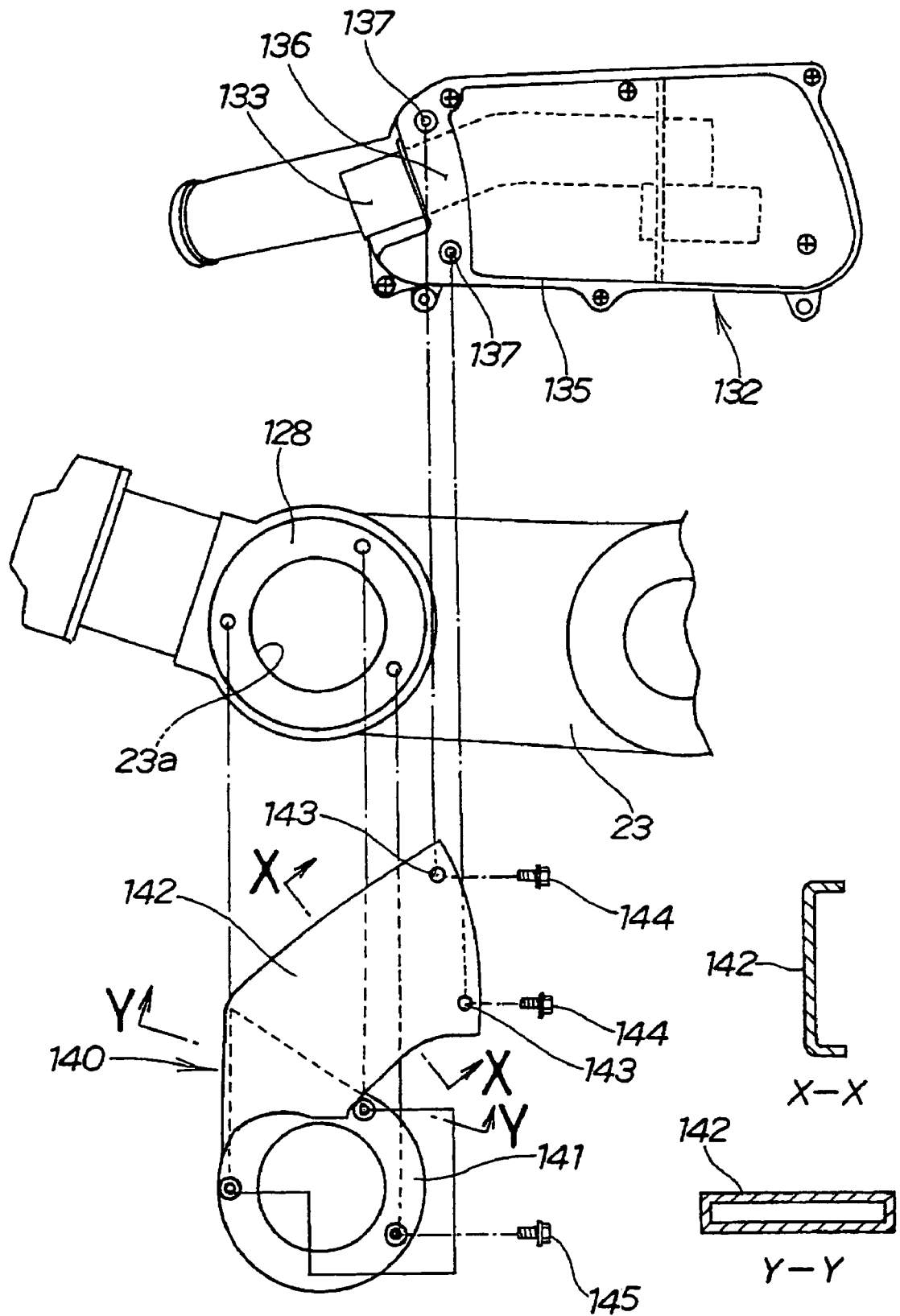
FIG. 21 shows a procedure for attaching an intake port cover according to the invention.

FIG. 21 shows a procedure for attaching the intake port cover according to the present invention with the utilization of the lid 128 of the power unit 23 being in the vicinity of the intake port 133.

That is, a concave portion 136 is made concave in a direction of the depth of the drawing and is provided relative to a case 135 of the air cleaner 132 and tapped holes 137, 137 that are provided adjacent to the concave portion 136.

The intake port cover 140 is composed of a circular plate 141 in substantially the same shape as the lid 128. A cover portion 142 projects from the circular plate 141 and bolt holes 143, 143 are provided to the end of the cover portion 142.

"X—X" shown in a right lower part of FIG. 21 shows the section viewed along a line X—X of the cover portion 142, "Y—Y" shows the section viewed along a line Y—Y of the cover portion 142. The sections show that the base of the cover portion 142 is a duct. Air for cooling can be conveyed to the power unit 23 via the duct.

The intake port cover 140 is fixed by bolts 144, 144 by overlapping the bolt holes 143, 143 with the tapped holes 137, 137 and is fixed by fastening the circular plate 141 jointly with the lid 128 by bolts 145, . . . for fastening the lid 128.

Figure 22:
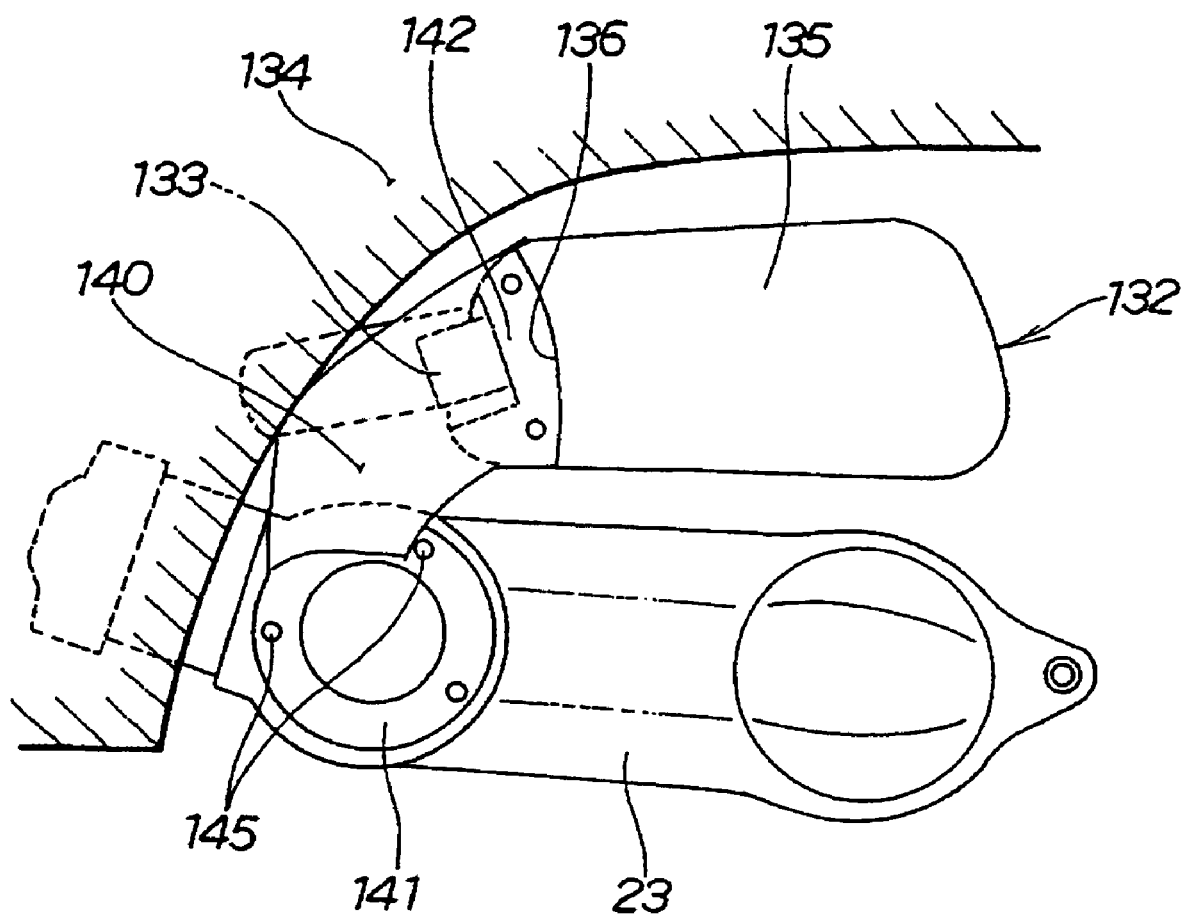
FIG. 22 shows a state in which the intake port cover according to the invention is attached.

FIG. 22 shows a state in which the intake port cover according to the present invention is attached and shows that the intake port cover 140 is attached by tying the power unit 23 and the air cleaner 132 without using a dedicated bracket.

In addition, the cover portion 142 of the intake port cover 140 is fitted into the concave portion 136 with the cover portion 142 ranging at the same level as the case 135 of the air cleaner 132 and the appearance quality is satisfactory.

Figure 23:
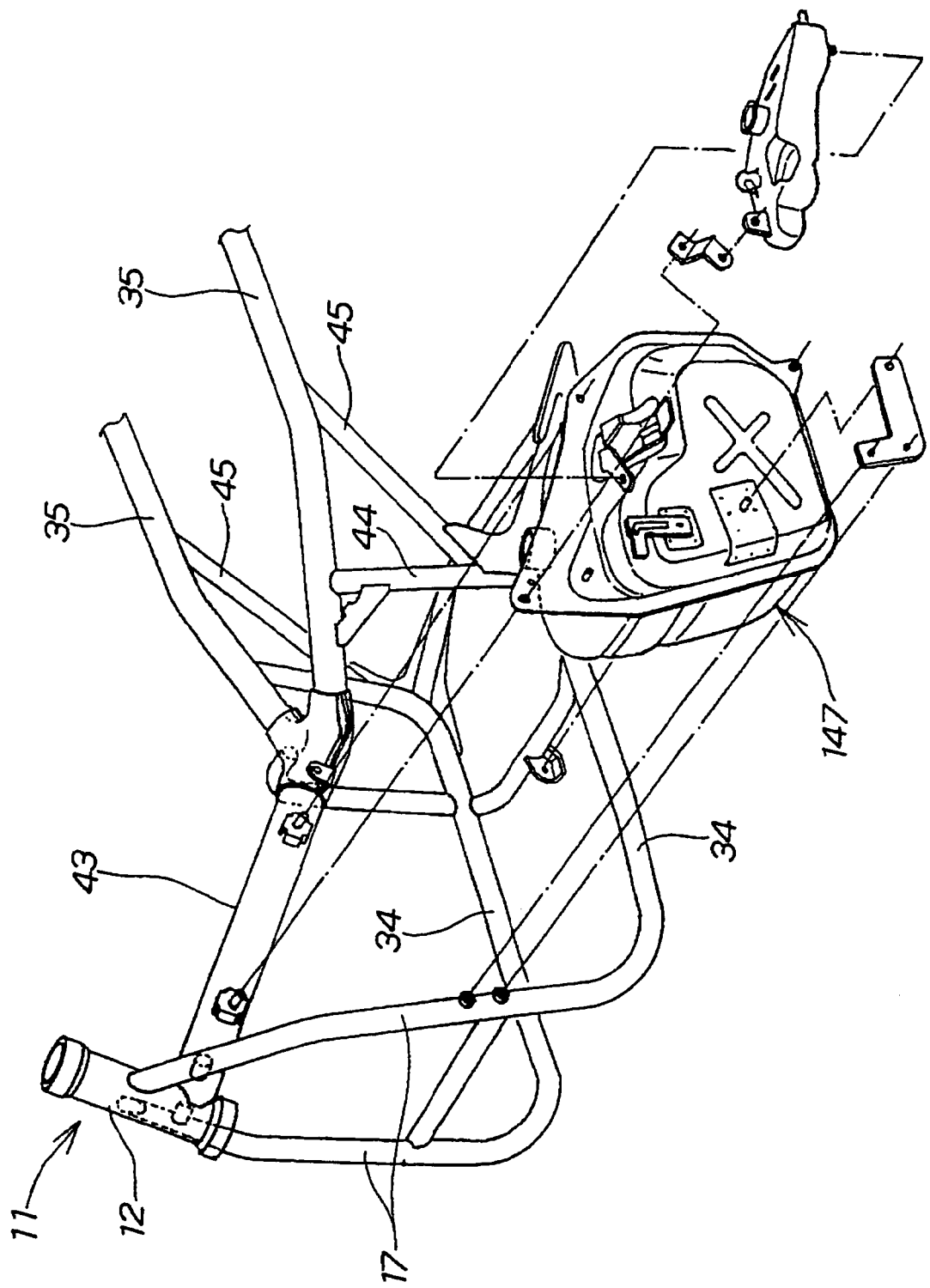
FIG. 23 is a perspective view showing the body frame according to the invention.
Figure 24A:
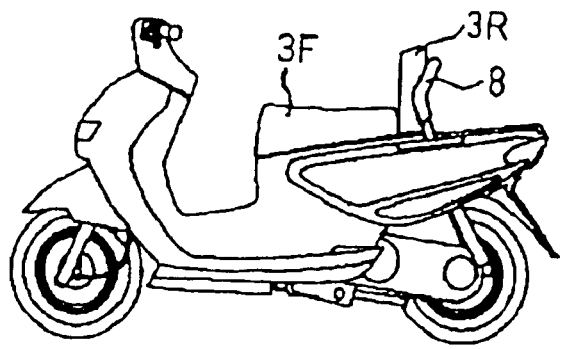
FIGS. 24(a), 24(b), and 24(c) are equivalent to FIGS. 7D, 7E, and 7F in Japanese patent document JP-A-2002-145143.
Figure 24B:
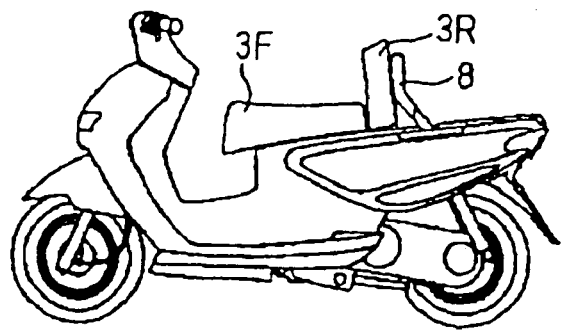
Figure 24C:
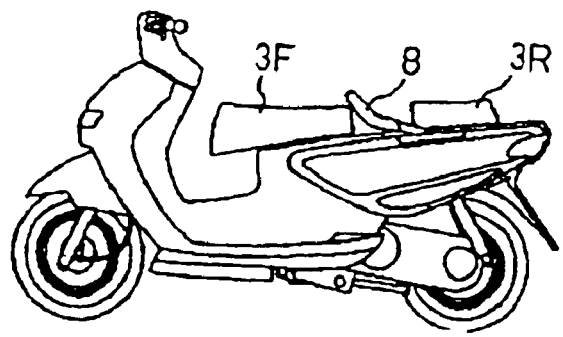
Figure 25:
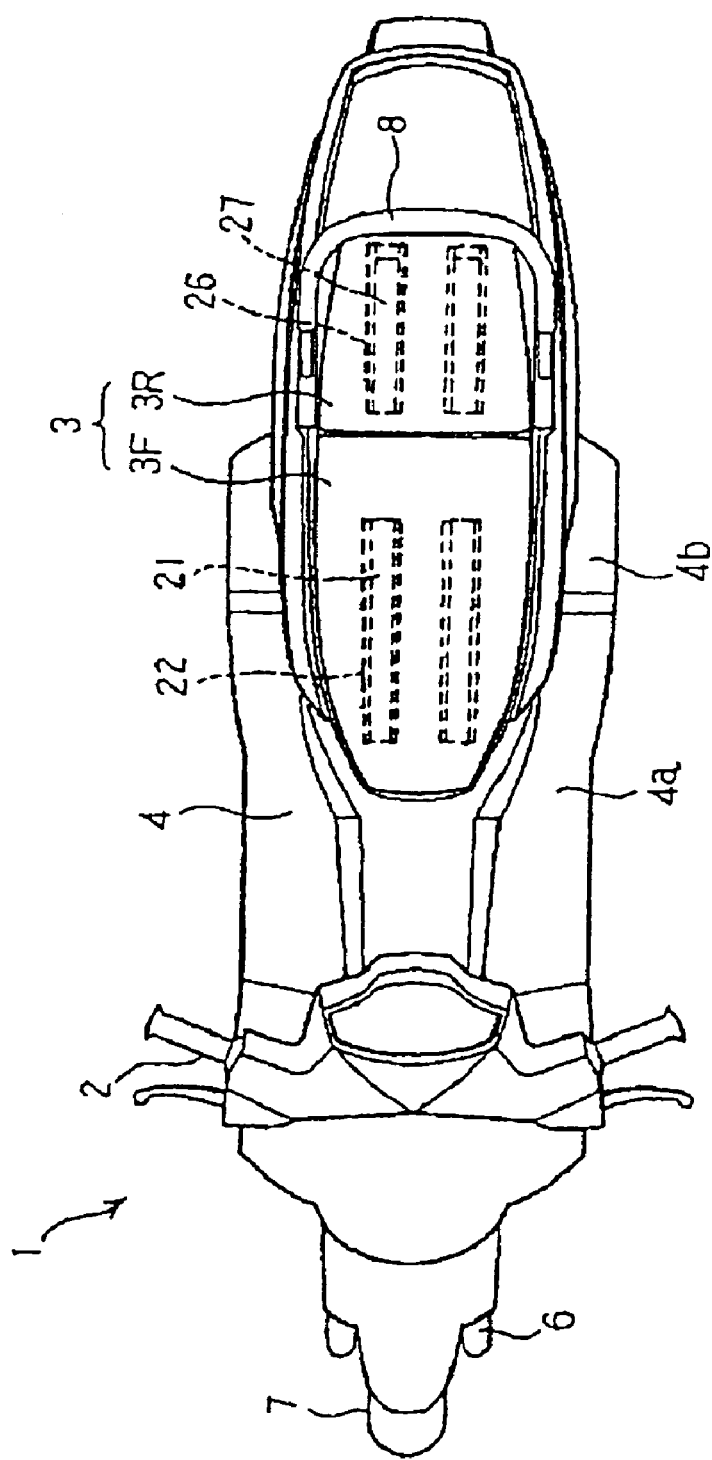
FIG. 25 is equivalent to FIG. 2 in Japanese patent document JP-A-2002-145143.

FIG. 23 is a perspective view showing the body frame according to the present invention and illustrating that the main frame 43 extends from the head pipe 12 and the two rear frames 35, 35 generally called a seat rail extend from the main frame 43. A fuel tank 147 is attached to the body frame 11.

A frame according to the present invention has only to be a member which can be attached to the existing main frame or the main frame and the rear frame by a bolt or other means later and the contour of the frame is arbitrary. Vehicular parts attached to the frame can be freely selected.

The present invention produces the following effect by the above-mentioned configuration.

The hook that enables the fastening of a rope and other means when the passenger seat is raised is provided on the back. Thus, luggage can be loaded onto the rear space when only the one rider rides and can be fastened by hanging the luggage on the hook directly or indirectly using the rope. As the hook disappears when the seat back that also functions as the passenger seat is made horizontal, the quality of the appearance is not damaged.

Therefore, luggage can be stably loaded and a larger quantity of luggage can be carried by the motorcycle according to the present invention.

A motorcycle is provided with a loading space that emerges when a seat back that also functions as a passenger seat is raised.

Luggage can be stably loaded when only one rider rides the mortocycle by providing the loading space at the back of a rider's seat.

A motorcycle is also provided with a reverse U-shaped grab rail when the grab rail is viewed from the side on the side of loading space.

The grab rail that functions as a grip member for a passenger when two persons ride can pass a string and a rope by making the grab rail a reverse U-shape and luggage can be easily fixed by the string and the rope.

A grab rail is attached to a body frame under loading space. The grab rail attaching part disappears by hiding the grab rail attaching part under the loading space and the appearance quality around the grab rail can be enhanced.

A glove compartment extends longitudinally in the body and is attached to a rear frame supporting loading space and a flange protruds forward from the glove compartment.

The glove compartment can house small things too small to load on the loading space and the loading capacity can be enhanced by the glove compartment and the loading space.

In addition, equipment such as a secondary air control valve can be covered by the flange protruding forward from the glove compartment and a body cover can be made compact.

The seat sliding mechanism is not required to be provided under the passenger seat. In this case, it is conceivable that the structure of the passenger seat is attached to a rider's seat via a strong link so that the passenger seat can be raised or pushed down and the whole load of the passenger seat is supported by the rider's seat. However, the link is large-sized.

Thus, the link fills only the role of linkage and a load of the passenger seat is supported by the inside frame provided in the vicinity of the rear frame.

As a result, the link for the linkage can be small in size and light in weight. As no rail member for sliding the seat is required to be provided under the passenger seat, luggage can be loaded onto space at the back of the rider's seat.

The passenger seat can be supported in any position by extending the inside frame longitudinally in the body.

Therefore, even in a motorcycle provided with the seat sliding mechanism, luggage can be stably loaded onto the rear space.

A passenger seat is arranged so that it is housed inside a rear frame when the passenger seat is viewed from the top in a horizontal state.

The passenger seat is not required to be large in size than needed and can be made compact. In addition, the rear frame can be utilized as an appearance part. Thereby, vehicles completely different in appearance can be produced using a body frame of a fully covered motorcycle.

The loading space is attached to a rear frame in a configuration that the loading space is loaded on an inside frame. A raised passenger seat functions as a backrest for a rider and luggage can be loaded onto the loading space.

Various arrangements of the seats are enabled and the load capacity of the loading space can be enhanced by the action of both the rear frame and the inside frame.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A seat structure for a motorcycle provided with an operator's seat for an operator and a passenger's seat for a passenger comprising:
    a seat back, said seat back functions as both the passenger's seat when positioned in a substantially horizontal position and may be raised to be a backrest for the operator when only one person uses the motorcycle; and
    a hook to which a rope and other means can be fastened when the passenger's seat is raised, said hook being provided on a rear side of the seat back,
    wherein when the seat back that also functions as the passenger's seat is raised, a loading space is formed behind the seat back, and the hook faces the loading space when the seat back is pushed down.

2. The seat structure of a motorcycle according to claim 1, and further including a grab rail on each side of the loading space, the grab rails appearing as reverse U-shaped grab rails when viewed from lateral sides of the loading space.

3. The seat structure of a motorcycle according to claim 2, wherein the grab rails are attached to a body frame under the loading space.

4. The seat structure of a motorcycle according to claim 1, and further including:
    a glove compartment extending longitudinally relative to the body and being attached to a rear frame supporting the loading space; and
    a flange projecting forwardly from the glove compartment.

5. A seat for a motorcycle comprising:
    a seat sliding mechanism mounted relative to a body frame;
    an operator's seat attached to the seat sliding mechanism;
    an operating lever operatively connected to a serrated member extending longitudinally relative to the motorcycle, the operating lever for selectively moving the serrated member between a locked state and a locking releasing state for sliding the operator's seat longitudinally relative to the motorcycle;
    a passenger's seat attached to the operator's seat or the seat sliding mechanism so that the passenger's seat can be freely raised or pushed down;
    an inside frame provided inside a rear frame provided to the rear of the body frame; and
    the passenger's seat when it positioned to be substantially horizontal is supported by the inside frame.

6. The seat for a motorcycle according to claim 5, wherein the passenger's seat is arranged so that it is housed inside the rear frame when it is viewed from the top in a horizontal state.

7. The seat for a motorcycle according to claim 5, wherein:
    a loading space is attached to the rear frame in a configuration wherein the loading space is loaded onto the inside frame;
    the raised passenger's seat functions as the backrest of an operator; and luggage can be loaded onto the loading space.

8. The seat for a motorcycle according to claim 6, wherein:
  a loading space is attached to the rear frame in a configuration wherein the loading space is loaded onto the inside frame;
  the raised passenger's seat functions as the backrest of an operator; and
  luggage can be loaded onto the loading space.

9. The seat for a motorcycle according to claim 5, wherein the seat sliding mechanism includes left and right seat rails and left and right sliders operatively attached to the left and right rails and to the seat to permit the operator's seat to be longitudinally slid relative to the motorcycle.

10. The seat for a motorcycle according to claim 9, and further including first connecting link mounted on the right slider and a second connecting link mounted on the left slider, said passenger's seat being operatively connected to the first and second connecting links for permitting the passenger's seat to be moved to the raised position.

11. The seat for a motorcycle according to claim 10, and further including lock lever operatively connected to either the first connecting link mounted on the right slider or the second connecting link mounted on the left slider for locking the passenger's seat in the raised position.

12. A seat structure for a motorcycle comprising:
  an operator's seat for an operator;
  a passenger's seat for a passenger;
  said passenger's seat being movable from a substantially horizontal position to a raised position for forming a seat back for the operator;
  a loading space behind the seat back when the seat back is raised;
  a hook for securing a rope or other means, said hook being provided on a rear side of the seat back for selectively fastening articles when the seat back is raised; and
  a reverse U-shaped grab rail disposed on each side of the loading space, the grab rails appearing as reverse U-shaped grab rails when viewed from lateral sides of the loading space.

13. The seat structure of a motorcycle according to claim 12, wherein the grab rails are attached to a body frame under the loading space.

14. The seat structure of a motorcycle according to claim 12, and further including:
  a glove compartment extending longitudinally relative to the motorcycle and being attached to a rear frame supporting the loading space; and
  a flange projecting forwardly from the glove compartment.

15. The seat structure of a motorcycle according to claim 12, wherein the loading space is formed by an irregular plate made of resin or light metal.

16. A seat structure for a motorcycle provided with an operator's seat for an operator and a passenger's seat for a passenger comprising:
  a seat back, said seat back functions as both the passenger's seat when positioned in a substantially horizontal position and may be raised to be a backrest for the operator when only one person uses the motorcycle;
  a hook to which a rope and other means can be fastened when the passenger's seat is raised, said hook being provided on a rear side of the seat back;
  a glove compartment extending longitudinally relative to the body and being attached to a rear frame supporting a loading space; and
  a flange projecting forwardly from the glove compartment.

* * * * *